(12) United States Patent
Miller

(10) Patent No.: US 11,837,902 B2
(45) Date of Patent: Dec. 5, 2023

(54) SYSTEM AND METHOD FOR CHARGING ELECTROSTATIC DEVICES UTILIZING DISPLACEMENT CURRENT, REFERRED TO AS DEFLECTION CONVERSION

(71) Applicant: Atlas Power Generation Inc., Mission (CA)

(72) Inventor: Mitchell Miller, Mission (CA)

(73) Assignee: Atlas Power Technologies Inc., Abbotsford (CA)

( * ) Notice: Subject to any disclaimer, the term of this patent is extended or adjusted under 35 U.S.C. 154(b) by 447 days.

(21) Appl. No.: 16/969,944

(22) PCT Filed: Feb. 13, 2019

(86) PCT No.: PCT/CA2019/050178
§ 371 (c)(1),
(2) Date: Aug. 13, 2020

(87) PCT Pub. No.: WO2019/161484
PCT Pub. Date: Aug. 29, 2019

(65) Prior Publication Data
US 2020/0412164 A1 Dec. 31, 2020

(30) Foreign Application Priority Data
Feb. 22, 2018 (CA) .................................. CA 2995969

(51) Int. Cl.
*H02J 7/34* (2006.01)
*H02J 7/00* (2006.01)
*H02J 1/00* (2006.01)
*H02J 15/00* (2006.01)

(52) U.S. Cl.
CPC ............ *H02J 7/0068* (2013.01); *H02J 1/002* (2020.01); *H02J 7/00712* (2020.01); *H02J 7/345* (2013.01); *H02J 15/00* (2013.01)

(58) Field of Classification Search
CPC ...................................................... H02J 7/0068
USPC ......................................................... 320/166
See application file for complete search history.

(56) References Cited

U.S. PATENT DOCUMENTS

| | | | |
|---|---|---|---|
| 4,031,899 A * | 6/1977 | Renirie | ................ A61N 1/378 607/34 |
| 5,146,395 A | 9/1992 | McKie | |
| 10,403,440 B2 * | 9/2019 | Carver | .................... H01L 28/86 |
| 2005/0052165 A1* | 3/2005 | Willner | ............. H02J 7/007182 323/266 |
| 2010/0276996 A1 | 11/2010 | Karipides | |
| 2011/0074361 A1 | 3/2011 | Tao et al. | |
| 2016/0105042 A1 | 4/2016 | Taylor et al. | |

(Continued)

*Primary Examiner* — Yalkew Fantu
(74) *Attorney, Agent, or Firm* — Nexus Law Group LLP; Nicholas P. Toth

(57) ABSTRACT

A system and method utilizing deflective conversion for increasing the energy efficiency of a charging circuit utilizing electrostatic storage devices, different circuit configurations composing a group termed deflection converters. Methods of deflection converter operation and construction include autonomous voltage controlled operation, current and or voltage measurement based control, timing based control, both passive and active devices and used in circuits of both alternating and direct current enabling charging efficiency up to 100% with instantaneous charging.

29 Claims, 6 Drawing Sheets

(56) References Cited

U.S. PATENT DOCUMENTS

2017/0162414 A1* 6/2017 Preuss ................. H01L 21/6831
2022/0367158 A1* 11/2022 Cui ................... H01J 37/32715

* cited by examiner

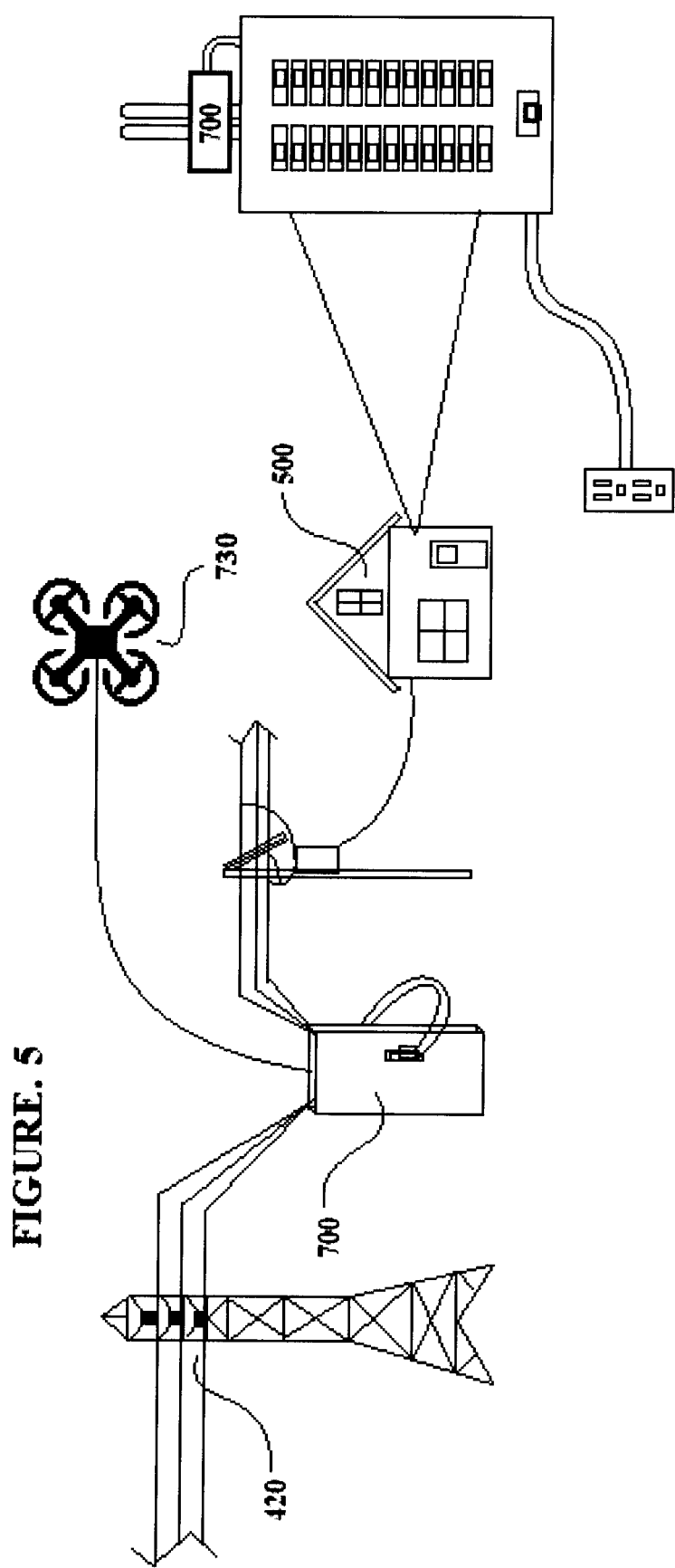

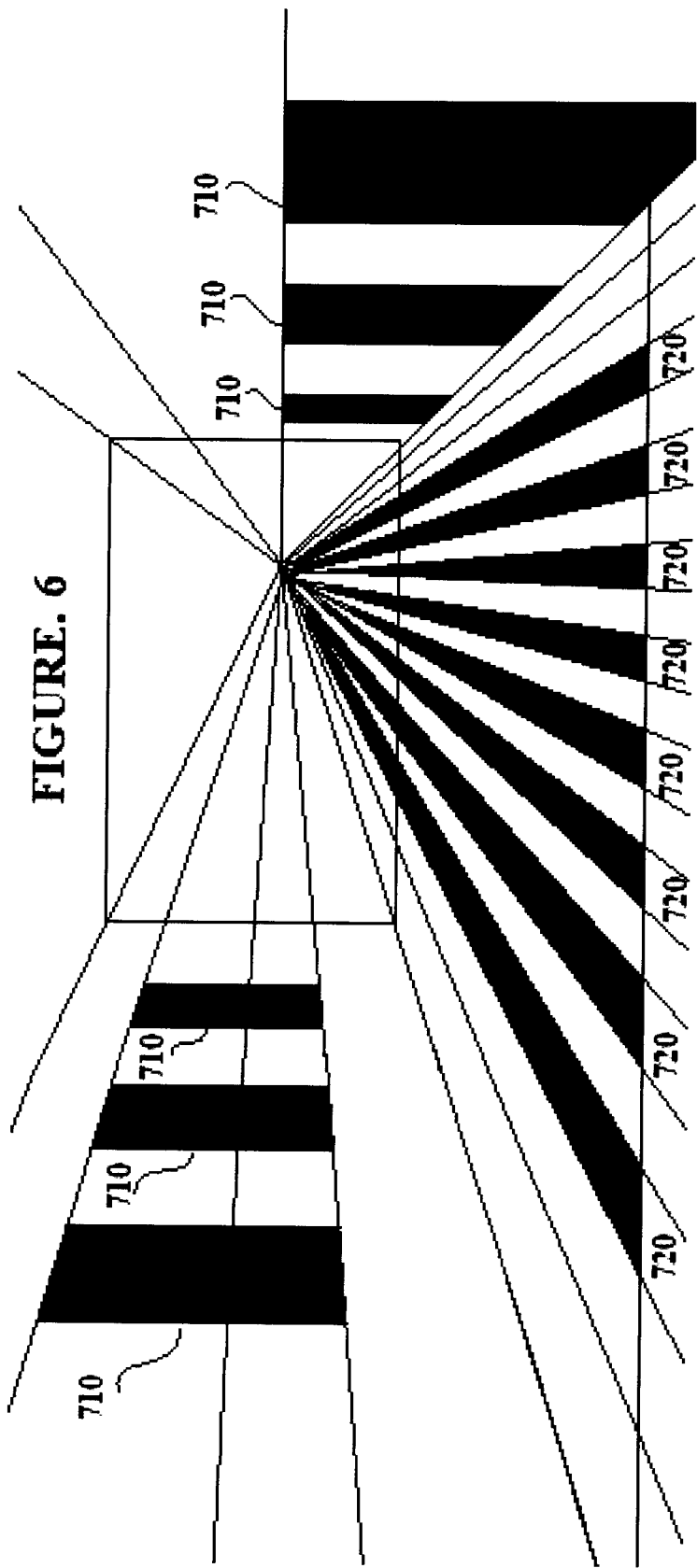

SYSTEM AND METHOD FOR CHARGING ELECTROSTATIC DEVICES UTILIZING DISPLACEMENT CURRENT, REFERRED TO AS DEFLECTION CONVERSION

TECHNICAL FIELD

The present disclosure is generally related to energy and, more particularly, is related to systems and methods for the reutilization, efficient utilization of available electrical potential energy supplied to a load.

BACKGROUND

The concept of using electricity in conjunction with electronics is well known; it has become a basic fundamental need of civilization and is of the greatest strategic importance. The use of energy storage devices such as capacitors is of equal importance as it allows the use and access of electricity on demand and available for immediate use, there are many examples of different variations and uses for such devises. From the time of Volta, Ewald Georg von Kleist, Pieter van Musschenbroek, Micheal Farady and Benjamin Franklin the advantageous effects of using these devises has been recognized and exploited, and variations on these devises have become fundamental components of our everyday life and way of living.

SUMMARY

Overview

The following disclosure presents an invention that when utilized within an electric circuit can greatly improve the efficiency of a charging circuit, both its overall work efficiency and power allocation over a defined period of time, for increasing efficiency and charging times. This is accomplished by introducing a device that is designed to switch into and out of an operating power circuit; this device is operated in a manner where it charges a separate device while the circuit is supplying current to a load. The operation of the discovery is in such a manner to allow charges to collect in a storage device while work is being performed, by connecting and switching a storage device leads into the circuit available to continue preforming work while charging the introduced storage device. I am terming this technology "Deflection Conversion Technology", this is due to the fact that charges in the circuit are only displaced "deflected" while charging the separate storage device preferably an electrostatic storage device, and efficient energy management ensures energy is not entirely lost in the current stream, the disclosed invention is operated similar to a linear ramp capacitor power supply though the actual operation in conjunction with a current is the inverse. During charging operation instead of ramping voltage up from a near zero potential, charging occurs in an operating circuit, where the voltage begins at maximum and is reduced while charging, then the output voltage is compensated for by a power converting technology ensuring a consistent voltage and current to the operating load. This operation allows electrical potential energy to accumulate in a storage device preferably a capacitor, coming from the supply energy source at source voltage, with a potentially high quantity of already flowing electrical current able to be exploited for the benefit of the charging operation, where energy is not lost because it is simultaneously powering the load, and additionally allowing the preferred capacitor to gain electrical potential energy at an efficiency level up to 100% conversion/consumption rate from the circuit (less device consumption) at a potentially instantaneous time rate of charging.

Technical Problem

Existing methods of electrical power charging systems, circuits and their operation are inefficient and time consuming, the systems and methods we currently use have not been able to overcome the inefficiencies and drawbacks presented in their operation. Specifically, in the context this disclosed invention the effect on deliverable energy while charging a storage device such as an electrostatic device and or capacitor, the efficiency of delivering a usable charge or current has been at the expense of wasted energy and or time.

The present disclosure offers a controllable system of electrical components that can be used to actively, passively or autonomously control the operation of a charging device and the in circuit energy deliverable to a storage device and a load, by utilizing this system and method a much greater efficiency is capable of being produced while charging storage devices at increased time rates and in certain circumstances it may be possible to charge items almost instantaneously, at near, and in certain circumstance what could be considered over 100% efficiency, by removing unneeded inefficiencies in a power transmission system explained later in the disclosure.

The current methods of operation limit the ability of this type of device, an electrostatic device, to achieve anything over 50% efficiency, when being charged via a common RC circuit. The operation of charging a capacitor itself can be attributed to the inefficient manner in which these devises are generally characterized, that being attributed to a capacitors resistance characteristics, and when commencement of charges begins to take place a capacitor will initially have very minimal in circuit resistance. This in circuit minimal resistance causes an initial dump of current from a power source with a higher voltage potential, so the work required to build the higher potential in the capacitor is effectively wasted (in RC circuits), this is due to the large initial current not being stored on the capacitor at the effective power supply voltage losing its potential energy. In effect the capacitor acts as an automatic varistor, as it gains charges and its electric field builds, it reduces the flow of current in the circuit, and as its electrical potential builds the transferring of actual stored energy increases at an increasing rate.

There are additional constant current ramping/stepping charge methods and devices that are more efficient, they generally require an increasing time allocation, which efficiency is directly correlated to, as time can be considered as an efficiency variable, as well, because the potential variance between the input voltage and the initial voltage of an uncharged capacitor in most cases varies significantly, can cause a drastic decline in efficiency over a portion of the charging operation, and may be in the extreme case allow only 50%-60% efficient over those periods. This creates a system of charging and usage that constrains the usable energy available from electrostatic storage devices to a narrower range than fully charging and then fully discharging into a load for usable work while maintaining high efficiency. This limiting range of operation for an efficiency benefit is because the overall efficiency of the capacitor charging operation becomes less efficient when charging across this full voltage range. This is very disadvantageous and has limited the usage and adoption of capacitors that are already faced with a specific energy density per weight disadvantage/limitation over other options such as batteries.

Additionally, it is not possible even with the most advanced switch-mode power supplies to exactly match at all points in time the exact amount of back EMF (resistive voltage stored on the capacitor) as well as the voltage and current flowing into and charging the capacitor. Instead these devices operate as steps for changing voltage and current through switching, and although advancements have improved the equality between voltage potentials and current flow there still exists inefficiency's (variation gapping) while in operation. All of these added inefficiencies as well as the increased time delay charging, complex switching circuits with their own operating limitations make these systems less advantageous then the disclosed system and method.

Solution to Technical Problem

The solution to the technical problem of less efficient charging and operation of electrostatic storage devices is; by utilizing a controllable system of electrical components that can be used to actively, passively, or autonomously control the operation of a switching and charging device, which by controlling the circuits electrical potential energy and current, can effectively and efficiently charge an electrostatic storage device (capacitor) and or devices while delivering energy to a load, utilizing in the preferred embodiment a existing flow of current to effect the time rate of charging and efficient charging operation.

When a capacitor is charged to a higher voltage a charge is stored on its metallic plates (or in the form of an electrostatic field) where two fields are created, referred to as a positive field and a negative field. These fields are physical manifestations of higher potential and lower potential; both their positive and negative fields exert an electrostatic/electromagnetic force that affects physical materials and devices.

By utilizing the storage devices electromagnetic/electrostatic fields you can exploit a property of its low internal resistance, this tolerance forms part of the devices rating, and if used effectively you can optimize the use of this type of devise to perform efficient charging of the electrostatic storage device, such as capacitors, in a novel way not previously discovered. This can be accomplished by utilizing a charging device and a non-limiting example of a capacitor, these components can be utilized to change the orientation/flow of an electrical power circuit, and if operated safely and ideally within the capacitors voltage tolerance range, with capacitors that are able to handle operation without causing damage, can be used to increase the circuits time rate of charging converting energy at nearly 100% efficiency, and over 100% if additionally transmission inefficiencies are removed. Effectively the device and operation cause charges to be utilized from an operating current stream to charge a capacitor, and then reintroduced/continue in the current supply stream which may be powering a load or flowing to a lower potential. This is done by deflecting charges through a capacitor and simultaneously powering a load, ensuring stable operation by compensation for the voltage drop produced by inserting the capacitor into the current stream, by utilizing a power converter/inverter as well as stabilizers ensuring a continuous output current, and by using this discovery in an effective way a novel system of great consequential importance can be created and utilized.

In order for the operation of the charging device to preform usable work in a novel way a number of schemes may be implemented, some non-limiting examples will be discussed. One way to implement the operation of the deflection converter is in a time series controlled operation; that being a timed or clocked sequence of charging a storage device while preforming usable work and or supplying a load. This type of operation can be very beneficial for ease of operation if the quantity of current being consumed is consistent and or controlled over a period of time, though in a varying demand operation this implementation may present many challenges. In a load based system that operates on a varying demand cycle a dynamical operation of the deflection converter and storage device is beneficial, and for proper safe operation may be required.

This dynamical approach will be the main and preferred approach to the disclosed invention presented in this disclosure as it offers the greatest operational benefits. This may be accomplished either through an active system of monitoring, with controllable parameters of operation, or through a current and or voltage range control and measurement operation, that may be controlled within a window of operation, either activated by voltage and or current measurement and triggering. The device may in some instances operate as an independent self-operable devise based on predetermined, or a variable control operational range.

The force exerted charging an electrical storage device; in particular a capacitor can be used in a way in which the potential of the capacitor and the circuit potential are both utilized, this is 1.5 accomplished by deflecting charges through the capacitor and into circuit creating usable work. The electric current is affecting the capacitor as the voltages are trying to reach equilibrium; this electric field is forcing a physical change in the characteristics of the capacitors electrostatic fields, causing a potential or voltage to grow while deflecting charges through the circuit. During the charging process the electrical potential energy is reducing though still forced back into the current path which if supplying a load and will perform usable work. The reducing voltage supplying the load may be controlled by means of a power converter/inverter and/or frequency drive to maintain a consistent voltage, this will cause the draw of current from the power source to increase, this is because of the voltage adjustment of the power control device. The effect being; providing in this case what could be considered as an increasing constant current source to charge the capacitor, which improves the efficiency of delivering energy to and while charging the capacitor. Additionally if utilized within an operating electrical current, with a high current flow rate can result in some cases with virtually instantaneous charging, even for larger devices such as electric vehicles.

The impact on the energy efficiency of this circuit is caused by the capacitors electric fields ability to exert a force on charges in the circuit, this is because the electrostatic fields of the capacitor are directly electrically connected to the circuit, though separated by an insulator, where one electrostatic field effects charges on the secondary plate. During operation of the device and circuit higher potential electrical field, the power source's electric field, is attempting to equalize, and in the process forces charges through the building electric field of the electrostatic device (capacitor). In this process a migration of charges in the circuit continues and an accumulation of charges in the form of an electrostatic field in the capacitor is continually building. This accumulation of charges is collected in a reverse bias way on the capacitor, meaning the capacitor when charged to a voltage potential from the power source, does not allow current to continue to flow in the circuit if a voltage potential equilibrium is reached. As the charge is building up the capacitor acts like an automatic varistor causing a voltage drop in the circuit, and if charged to circuit potential though not preferred, the capacitor will share an equal voltage potential with the power supply and current will virtually cease flowing. In order for the charged capacitor to be utilized in the circuit it must direct the flow of current in an opposing direction versus its charging orientation and if the capacitor leads are connected into a circuit the energy is available to be realized and able to perform usable work. Where the novelty and differentiation of the disclosed system and method resides as well as its cause and effect is; during the actual operation of the deflection converter as it is introduced into a circuit, a power supply is providing energy to a load preforming a usable work product. If while in operation a deflection converter is connected in series as a tap in point that charges then flow through and is inserted into the current stream by the deflection converter, the capacitor will act as an intermediary powering the load and gaining potential energy. It will continually cause a decreasing effect on the voltage supplied to the power source (a voltage drop), which is then compensated for by means of power control device/converter, stabilizer ensuring the output voltage is the desired level. This in turn has no effect on the load but provides immense benefits to the charging efficiency and charge time rate and duration while charging the capacitor.

Explaining this further, the efficiency of transferring the potential energy in this operation is maximized because the current is already supplying a load and since the capacitors in circuit resistance is directly proportional to its voltage, no energy is lost at any point of the charging action as charges and voltage pass through the capacitor, there are losses in power conversion/control which will be discussed further on. Additionally on the negative/output side of the capacitor a power converter/inverter is located and manages the reducing voltage by stepping up the output voltage supplying the load, this has the added benefit of drawing additional current through the capacitor in order to step up the voltage, this in turn maximizes the charge rate of the capacitor.

The reduction from 100% efficiency while charging the capacitor is potentially from 3 sources for AC current "alternating current", and 2 source from a DC current "direct current" supply. In a circuit operating from an AC power source supply the reduction in efficiency comes from a AC-DC transformer/power converter on the input or high side, the deflection converter electrical consumption and the output power converter/inverter on the low side. The benefit of the disclosed system and method is also evident in that the charging operation can be operated in voltage ranges that far exceed the capacitors voltage rating, this is the case as long as the capacitor is disconnected from the circuit before it reaches its specific voltage rating. This higher operational voltage allows operation at maximum efficiencies as the efficiency is directly proportional to the difference in voltage potential, so utilizing a deflection converter the AC power input can be transformed at near equality of voltage and utilizing high voltage devices and components rather than being constrained to only high amperage components, then routed through a deflection converter charging a capacitor and then into a power inverter/converter at a voltage level that in some case within a few volts of the original supply voltage. Where efficiencies are able to be in the measure of 98%-99% from the input converter/inverter, 100% conversion charging the capacitor less minimal switching costs, and 96%-98% on the output inverter/converter, additionally because the of operation of the deflection converter can be considered charging the capacitor on the high side of a power current/circuit, the connection to a utility system can be at different points of the transmission system. Where the connection to the transmission system effects operational efficiency is; at every transformation point (step down transformer) energy is lost and efficiency goes down, ratings generally estimate efficiency of up to 98.8% but in practical applications and historical operating norms there is actually losses of between 4%-6% at each step up and or step down transformation point. Moving up stream of the traditional connection points in a utility system i.e. before each step down and or up transformer causes the efficiency of deflection converter technology to increase. This is able to be accomplished because the current is monitored and controlled, which may be on the output, or the actual capacitor, to only allow the capacitor to gain the voltage that is desired and within its operational limits, so no damage occurs to the capacitor. Where the energy potential stored on the capacitor is exactly proportional to the drop in voltage potential entering the output boost converter/inverter.

An example of this would be connecting a deflection converter directly to the high voltage transmission lines, the practical application will not be designed and laid out only the theoretical efficiency, with the understanding that this is within the capabilities and development future of deflection converter technology in some embodiments. So by directly connecting to a transmission line of potentially 400,000 volts (arbitrary number) you can bypass two or more step down transformers and transmission points, and though this voltage may seem unreasonably high it is actually a common transmission voltage that is usable, with developed technology and electrical devices able to handle this voltage and operate safely. When a deflection converter is directly connected to this point in the transmission system the theoretical efficiency to charge a capacitor is as follows 1%-2% input converter/inverter loss, minimal operational loss from deflection converter 0.01%, 2%-4% output inverter/converter loss, and because the voltage state remain near supply voltage a low 1% and 2% loss can be expected providing a practical potential 97% efficiency. This 3.01% loss is then taken into consideration against the losses that were excluded from the transmission system transformer losses in this case two step down transformers with losses of 4%-6% respectively. This means there is a real world efficiency level able to be utilized with deflection converter technology to charge electrostatic storage devices/capacitors at between 101.99% and 108.99% respectively. Though this may to the novice experimenter seem unviable in a practical implementation switching and voltage/current monitoring has advanced to allow an effective action to occur in the terahertz at a specific point within that divisible timeframe, and so it is possible in a real world application to charge a capacitor(s) within its voltage range at this high transmission voltage without damaging the capacitor almost instantaneously.

When comparing deflection converter top down charging technology to current ramp-up power supplies for charging electrostatics/capacitors the difference and benefit of deflection converter technology becomes obvious. In order to use a ramp up method the only way a capacitor can efficiently store the charge, not lose energy in the actual process of transferring a charge to the capacitor, is to introduce to the capacitor current at near zero voltage which gradually increases. This can be accomplished with devices such as switch-mode power supplies, though during operation because the voltage state of the capacitor is zero to begin with energy must be immediately lost flowing into the capacitor as no work is being accomplished. Additionally, during the entire operation the power supply must maintain a higher voltage state to charge the capacitor causing small but real losses actually converting the energy to the capacitor. Next the actual power supply is converting a higher voltage to a lower voltage to charge the capacitor, this drops the efficiency of the power supply substantially and in some cases this large variance can cause a real world inefficiency of 50%, though gradually reducing as the capacitor is charging and its voltage is increasing closer to supply voltage. Further this system and power supply cannot be operated and connected at different points of a power transmission system, as the act of converting a higher voltage of for instance 400,000 volts referenced in the last example, and converted down to near zero volts though possible, would provide no added benefit or efficiency improvement other that potentially eliminating one step down transformer. And though the energy able to be effectively converted from the power supply to the capacitor can reach levels of 95% efficiency, the actual power supply's efficiency while converting the supply current through the whole capacitor charging operation is constrained to typically 75%-85% efficiency, far less than deflection converter technology and without the additional increased charging time rate factor. The most important thing to remember is that efficiency is affected by the way in which a device is operated and the environment in which it finds itself. Some notable conditions where efficiency is impacted are the actual input voltage range referred to as a devices low and high lines for use, as well as the output voltage where a large variation tends to have a large impact on efficiency, as well as switching frequency and the actual time of charging where the unit is operational and consuming power.

In the present disclosure the current is forcing a build-up of charges and potential increase in the capacitors electrical or electrostatic potential, and additionally simultaneously preforming usable work in the circuit. The capacitor is effectively charging its potential, while deflecting charges that are preforming usable work, at the same instance in the circuit; this is because the electric current is exerting a continuous force on the capacitor continuing the flow of charges, though the voltage potential is in relation to the charge build up in the capacitor and forms it's in circuit resistance and voltage drop.

Operating the device in an operational range allows capacitors to operate within their own individual tolerance or voltage range rating, so as would be the case if utilizing a lower voltage rated capacitor in a circuit with a higher voltage state or potential that would normally damage the capacitor. Utilizing a design to operate within the capacitors voltage rating through parameter design, would produce a safe stable operation. In order to deliver the most benefit both an electric current or currents, and a switching capacitor, capacitors and or storage device as well as the operational range must be considered, this includes duty cycle as well as switching energy requirements, fluctuation tolerances of in circuit components, devices and loads, and resistances of circuits/components to effectively utilize the power bands during the charging cycle. A circuit may benefit greatly by designing architecture to change a circuit's resistance during operation, which could have the effect of preventing an over-current and or over-voltage failure from occurring.

The result of utilizing an existing flow of current is that the capacitor is gaining energy potential while in a state of minimal energy consumption from the circuit, effectively dipping into a flowing current at a low resistance state. When the capacitors is introduced into the circuit the energy required to charge the capacitor can be viewed as a automatically varying constant current source, with the capacitor entering at a zero state of energy loss, meaning the efficiency of the circuit is maximized because all of the initial current that would normally be wasted charging the capacitor is already supplying a load at circuit voltage/potential and the act of inserting the capacitor/storage device only effects the current supplying the load as the energy is being stored, and the potential is increasing on the capacitor/storage device, the capacitors potential energy and its current resistance being at a constant equilibrium with energy being extracted from the circuit. This extracted/converted energy/voltage potential is compensated for by drawing more current into the deflection converter through the charging capacitor and into an output converter such as a DC-AC converter or DC-DC converted/inverter, that's function is to step up the voltage to maintain a consistent output to the load, thereby having no negative impact on the load and its operation.

The explanation of the actual capacitors/storage devices operation is quite straight forward, when the capacitor/storage device is connected in the circuit in a normal in series connection with an electric current, charges are collected on its conductive material or as an electrostatic field. Those charges and potentials stay as part of the capacitor until a discharge occurs even if removed from the charging circuit.

This is the same for a multitude of energy storage devises, in this case capacitors; this charging operation effectively increases the efficiency of charging this device while increasing the time rate of charging substantially. This method uses the properties inherent to this type of devise for maximum benefit and utilization, and the actual operation of the deflection converter technology in most cases represents an insignificant loss, electricity consumption, for the benefit realized, both in the efficiency of transferring a charge to a capacitor/storage devise and the actual speed increase in charging time, which if utilized effectively could be in most cases instantaneous or almost instantaneous, or over a very short period of time.

In some embodiments, it may be greatly beneficial to have multiple pluralities or combinational arrangements of the disclosed system and method. This is to allow the operation of devices by utilizing the effective power range of a capacitor or energy storage device, and when the voltage in the circuits and or power supply is diminished or affected to a range that is not desired, an additional plurality may be rotated into operation, or additionally the current may be routed through circuits that have a lower potential or voltage, and or may additionally be controlled by increasing and decreasing a circuits resistance and or increasing the current draw by converting the lowered output voltage by means of a converter, to control the circuit voltage and or current as well as supplying the load. This will allow power to the main load while the voltage supply remains unaffected to stabilize the voltage and minimize fluctuations, that could be placed consecutively or a plurality and may be placed before the stabilization and or conversion of the current occurs.

Additionally, it may be of great benefit to use a plurality of capacitors or storage devices such as batteries and or hybrids connected in parallel and or series and or combinational arrangements during charging, this would allow quick charging times and the ability to utilize large volumes of current, this is because the switching device and storage devices could be designed to handle thousands of volts, or even hundreds or thousands of volts while charging, and then be discharged in a more parallel arrangement for increased output current/storage capacity into batteries and or hybrids as well as they may be used to form a combining base to totally discharge a capacitor in operation through a series arrangement and or connection.

This embodiment may operate and would allow cross operations of charging capacitors and or storage devices during operation which may be at different energy states. Likewise, it may be very advantageous to implement a management system and or use a plurality of switching devices in a single circuit or operating multiple independent circuits utilizing the main electric current, to improve efficiency and circuit design, this may be used to slow down the speed, rate and or range of the voltage disturbance/variance in the main power supply creating a more uniform voltage, without subjecting the circuit or load to a large variation in voltage, which could be of great use for a more efficient less power consuming operation.

BRIEF DESCRIPTION OF DRAWINGS

The invention will be described by reference to the detailed description of the preferred embodiment and to the drawings thereof in which:

FIG. 5 Are illustrations of possible methods for integration as well as device uses of the deflection converter and its possible applications.

FIG. 6 Is an illustration of possible utilization methods for implementation of the deflection converter technology.

DETAILED DESCRIPTION

Therefore a heretofore, unaddressed need exists in the industry to address the aforementioned deficiencies and inadequacies.

Figures and embodiments contained are to demonstrate possible variations and to give a clearer understanding of the theory and method herein, to allow one with ordinary skill in the art to gain the ability to re-create said method.

Figure 1:
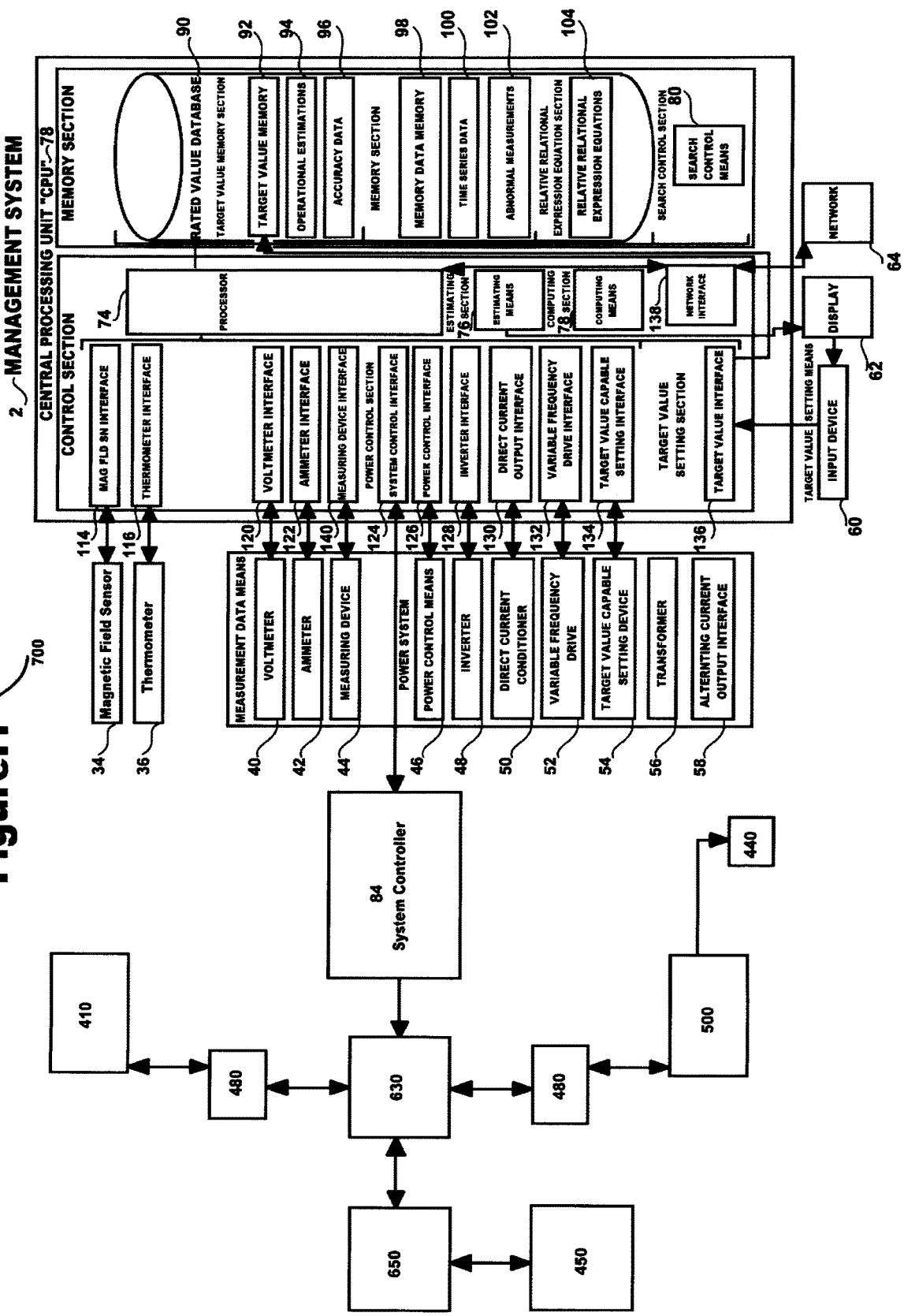
FIG. 1 Is a block diagram comprising a circuit controlling the management and collection of charges through a capacitor (electrostatic storage device) referred to as a "Deflection Converter".

Embodiments of the present disclosure can also be viewed as providing systems and methods for managing and controlling the operational voltages and current from a current source utilizing an electrostatic storage devise in a novel way, operating within a circuit with an improved method and circuit design, this can be briefly described in architecture one embodiment, among others, can be implemented by;

FIG. 1 is a block diagram of the device utilizing a management system 2 uses a system for managing energy, accumulation, storage, switch, and discharge system the device may be connected and controlled by any number of management systems 2 and techniques and may include system controller 84 and or microcontroller. The controller 84, may be controlled by a computer code or script, embedded system, or artificial intelligence, controlling commands of the controller 84, connected to the circuit, may use a plurality and multitude of different switching devices 480 and current and polarity control devices and may comprise different switching device 480 and or capacitor/electrostatic storage device 450 arrangements. The input and output of each electrostatic storage device 450 may be connected to separate output switches 480 or a single switch 480 or relay (not shown) or not, and may include multiple relay poles which could be any number of different types or styles for electronically controlled switching and or current control device 630, with all or some switches 480 controlled by a CPU "central processing unit" 78 or paired with an existing CPU 78, in a non-limiting example of a master and slave configuration. The CPU 78 may be controlled by a computer code or script, embedded system, or artificial intelligence, that tells the system controller 84, to send a signal to relay's (not shown) or switches 480 which may be connected to a power control device 630, which may be connected to a charge booster and or multiplier and or buck and or switch mode power supply circuit and or converter 650, which may discharge through a load 500, or another storage device to create usable work and or ground 440.

Additionally some embodiments may utilize a management system 2 as a component of the device which may control various functions some or all of which may consist of, the operation of all electronically operated components; the charging and or connecting and or disconnecting and combinational arrangements of an electrostatic storage device 450 and or device and or contact and or contact point(s); power regulation means 46 for regulating power; a memory section, a search starting means 80 for starting a search; measurement data acquiring means 44 for acquiring magnetic field data and or electric power data, the magnetic field data being measured values of the energy sources and or magnetic field and or capacitor/electrostatic storage device 450 data. The electric power data representing information associated with electric power that is outputted from the energy source 410 and required for operation and used by the management system 2 and or stored on the electrostatic storage device. Functions may also include deriving means for deriving a relational equation that holds between the magnetic field data and electric power data to maintain target values including voltage and current output and or capacitor voltage potential state. Monitoring functions for abnormal state determining, and may include means for determining whether or not the energy source 410, a collection device 450, or any energy switching 480, energy transforming and or converting 650, or managed circuits 2 are in an abnormal state. Searching functions 80 and a search procedure, selecting means for selecting, and in accordance with a result of determination of the abnormal state determining means, a procedure for managing abnormal energy sources, magnetic fields, accumulation devises 450, capacitors 450, switching devises 480, transformers 56, management circuits 2.

In some embodiments, the management system 2 is needed to facilitate managing the electric current 410, then switching an electro static storage device 450 into the current stream 410, then storing the collected charges in an electrostatic storage device 450, then switching collection devices 450 in circuit orientation and or disconnecting it from the circuit with a switch 480 and or switches, and then may and or may not discharge collected charges, which may require multiple switching of accumulators and or electrical storage devices 450; at a controllable rate, that can be replicated and controlled to an extremely high number of pluralities. To maximize energy from an energy source 410 and or accumulators and or electrical storage devices 450 can be accomplished with current 42 and voltage 40 measuring devises, switches 480, accumulators and or electrical storage devices and or including capacitors 450, power converter(s) 650 and or AC converter(s) and or DC converter(s) and or inverter(s) 48 and or transformer(s) 56 and or sequential and or parallel and or series arrangements as well as voltage output stabilizer to ensure uninterrupted operation of a load 500 with for instance capacitors (not shown) for ensuring current continuity. And in some embodiments a simplified management system 2 may be beneficial utilizing some and or different arrangement of listed or other functions, and additionally a mechanical system in some embodiment may be advantageous, for instance pairing with a commutator switch (not shown), or relays (not shown), utilizing the driving forced for controlling switching and energy characteristics, and in some embodiments utilizing no management system 2 instead using current oscillators, comparators, op amps, decade counter, motor, generator or natural means to control the switching 480, force and or speed, this simplified management system 2 may be advantageous for a consistently regulated and or switching electrostatic storage device 450 and or energy source 410, and additionally in some embodiments having a circuit configuration and components to additionally allow traditional and existing capacitor 450 charging methods for instance a constant current and or ramp up operation supply, as well as a traditional RC circuit to ensure deliverable charging in the event current flow to a load 500 is of an insufficient quantity.

Each circuit and module is an electrically connected system of components, and may be managed by the management system 2, which may include additional devises and systems such as; a steady electric current 410, circuit, a display 62, a direct current power conditioner 50, current power output interface 130, power converter 650, a thermometer 36, a thermometer interface 116, magnetic field sensor 34, magnetic field sensor interface 114, voltmeter 40, voltmeter interface 120, an ammeter 42, an ammeter interface 122, a measuring devise 44, a measuring devise interface 140, an inverter 48, an inverter interface 128, a system controller 84, a system controller interface 124, power control means 46, power system interface 126, a target value setting capable device 54, a target value capable setting device interface 134, an input device 60, a target value interface 136, an alternating current output interface 58, a transformer(s) 56, a variable frequency drive 52, a variable frequency drive interface 132, a central processing unit "CPU" 78, a processor 74, estimating means 76, computing means 78, network interface 138, load 500, search control means 80, relative relational expression equations 104, abnormal measurement memory 102, time series data memory 100, measurement data memory 98, accuracy data memory 96, operating estimations data 94, target value memory 92, a rated value database 90 that may be connected to a network 64.

The control section can serve to control the overall control and operation of various components of the management system 2, circuits, modules, and the memory section can serve to store information. The control section may be configured to include a measurement data acquiring section (measurement data acquiring means 44), the amount of current/voltage (current 42/voltage 40 acquiring means), a computing section (computing means 78), a target value setting section (target value setting means 54), a search control section (search starting means 80), power system section (power system controlling means 46), and in estimating section (estimating means 76). Further the memory section may be configured to include a target value memory section 92, a memory section 98, and a relative relational expression equation section 104, a rated value database 90.

The memory section serves to store, as measurement data 98, measurement data obtained from each measuring instrument while the management system 2 is operating. Specifically, the measurement data 98 may contain the following measured values measured at the; measure point of time, operating current value, operating voltage value, amount, magnetic field strengths, and temperature. The measure point in time is data representing year, month, day, hour, minute, and second. Further the operating current value in operating voltage value refer to values of an electric current and voltage is measured at a point, respectively.

Further, temperature may be measured by the thermometer 36; magnetic fields are measured by a magnetic field sensor 34. The rated value database 90 is provided with a memory section and a target value memory section. The memory section serves to store relative relational expression equations 104, for maintaining operating current values and operating voltage values. The target value memory section, serves to store target values 92 of the operational estimations 94, and accuracy of relative relational expression equations 96, that determine power usage and magnetic field strength relations, to ensure optimal system performance and efficiency, that can be interpreted for command allocation.

The measurement data acquiring section, may serves to acquire measuring values from each measurement instrument. Specifically, the measurement data acquiring section may acquire measurement data of (electrical power data, temperature, magnetic field data), which is time-series data, containing the electric current value, the voltage value, the temperature, the magnetic fields, from the measuring instruments of the ammeter 42 and voltmeter 40, the magnetic sensor 34, thermometer 36, and from the electrostatic storage device 450 and sends the measurement data to the search control section 80 of the database 90.

The search control means 80, may search for relative relational expression equations 104, to interpret historical relations to measurement data values 98, and interpret proportional relationships between stored measurement values 98, operational characteristics, and predetermined target value ranges 92, including output characteristics, discharge relational information including combinational arrangement output power data, cluster and module combination data, and duty cycle optimization equations.

The search control means 80, may compute measurement characteristics if measurements have been measured and stored even once and can compare characteristics with the target value setting section 54/134, which may also incorporate a learning effect, or artificial intelligence, interpretations can be interpreted by the central processing unit CPU 78, which can send instructions to the system controller 84, which can then send command signals to active switching 480 and control systems, and components, to control predetermined, or instructed operational target values 92 and functions.

The measurement data acquiring section, may also serve to determine faults, by acquiring and comparing measured values from the measurement data memory 98 storage section, and by interpreting abnormal operating system measurements 102. Abnormal measurements 102, may be stored in the memory storage section, and additionally may be sent to the display 62, to indicate to users of the management system 2, abnormal measurements 102, or may be sent to the control section and the target value memory section, and may perform tasks such as bypassing abnormally operating circuits, modules, systems, or component's, and or by compartmentalizing systems containing faults and maintaining predetermined target operating conditions, output power characteristics and functions.

It should be noted that measurements may be computed by performing measurements by measuring each instrument once, or more than once, at a time of introduction of the management system 2, or may be computed as a search performed manually by the user's operating the management system 2, or may be performed automatically, e.g., regularly. In particular measurements may be performed at predetermined intervals, or from time to time. The exacting control of the electromagnetic, electrostatic and electrochemical fields under the devices management is a main primary concern of the disclosed invention, switching consumption is of concern in order to not reach an inefficient level, though a certain trade-off of output energy and energy consumption occurs.

Included as possible embodiments a multitude of current and or voltage sensing and triggering techniques may be used and are referenced herein as possible alternate embodiments and are explained in the section "Initiating and Control Methods". As well in this embodiment a switch is used though in other embodiments a number of switching devices and methods may be used and are referenced herein as possible alternate embodiments and are explained in the section "Switching Methods and Devices", and may incorporate a management system or process and are referenced herein as possible alternate embodiments and are explained and referenced in the "Management Systems and Processes" section. A circuit may benefit greatly by designing architecture to change a circuit's resistance during operation and are referenced herein as possible alternate embodiments and are explained and may be accomplished with reference to the section "Resistance and Current Control". This resistance may be used to control the current and or voltage to ensure the desired output power at different stages of the capacitor operation, and or during operation of a varying potential and or current power supply or source, referenced herein are possible alternate embodiments and are explained and may be accomplished with reference to the section "Current Source and Power Supply". Additionally, the operation of the device and electrostatic storage device/capacitor 450 system and allow for a number of possible output current state and ranges referenced herein are possible alternate embodiments and are explained and may be accomplished with reference to the section "Output Characteristics". Though a management system 2 is described and referenced possible alternate embodiments are additionally referenced herein and are explained and may be accomplished with reference to the section "Integrated Circuits". Though a capacitor 450 for charging is referenced possible alternate embodiments are additionally referenced herein and are explained and may be accomplished with reference to the section "Storage devices". Though a generic load 500 is referenced possible alternate embodiments are additionally referenced herein and are explained and may be accomplished with reference to the section "Implementations" as well as the section "Applications".

Figure 2:
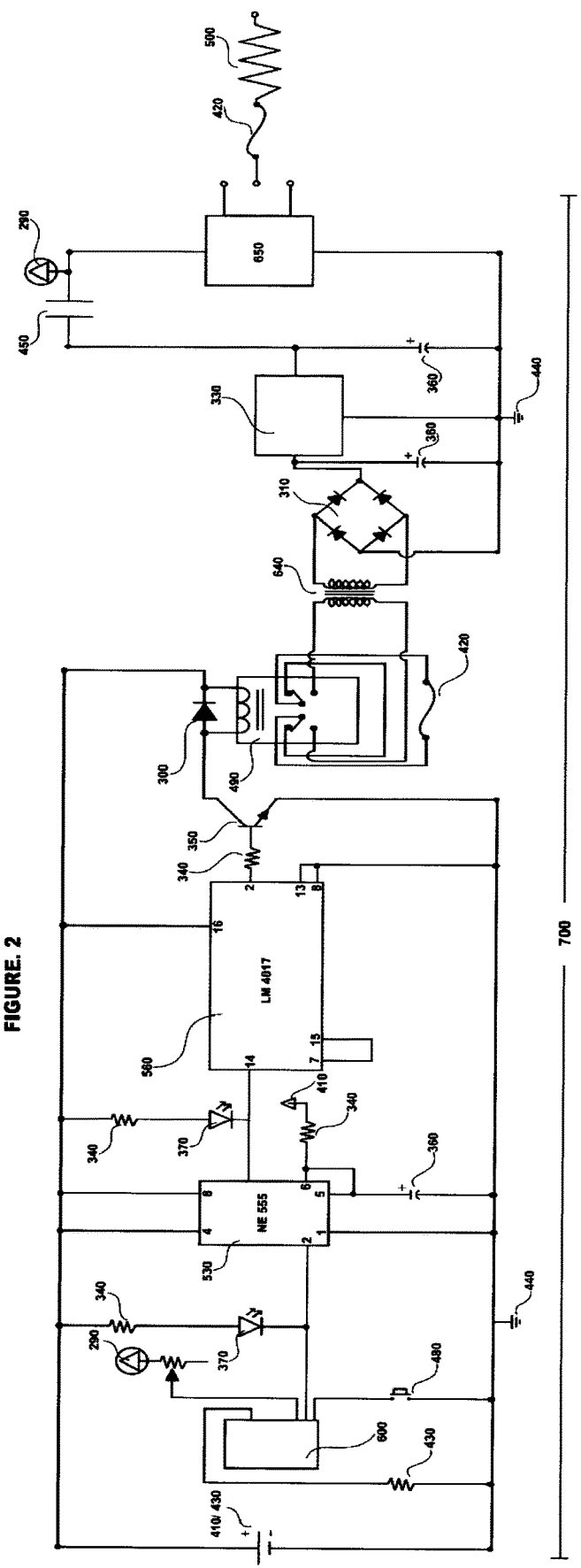
FIG. 2 Is the preferred embodiment of the invention utilizing and converting an alternating current into a direct current for use as a deflection converter.

FIG. 2 illustrates the preferred embodiment comprising a circuit controlling the management of charges and or potentials for charging a capacitor (electrostatic storage device) 450 herein after referred to as a "Deflection Converter" 700. The design of the circuit allows a power sources current to flow in this case an AC power source 420 into and out of the deflection converter by means of a switch and or switches in this case a double pole double throw relay 490, it should be noted the deflection converter 700 in some embodiments may be a stand-alone charger and in other embodiments may be directly built into a the device(s) which may able to be used with a multitude of power source(s) which may connect or be connected with via switch(s), and or made to allow contact for an electrical connection and or may connect electrically through a wireless and or transmitted operation. The relay 490, which could be any number of different switches and or transistors 350 controls the operation of the capacitor(s) 450 leads in the circuit, which could smaller or larger capacitances depending on an individual application and duty cycle. The relay 490 allows the capacitor to enter into an operating circuit, this takes advantage of charges currently flowing, then into the capacitor 450 storing in a reverse polarity and or orientation transferring energy from the circuit to the capacitor at 100% efficiency less operating losses, while the circuit has been powering a load 500.

With multiple power sources 420 or loads 500, this in circuit angle could be redirected to a different current source 410 and or DC power source 420 and or load 500 and effectively change it's in circuit orientation further effectively charging at different potential states, and or steps, additionally allowing operation in a plurality and or series design. The different quantities of capacitance of the capacitor 450 effects duty cycle and operation, in that the time is extended or decreased as time is needed for charges to collect in the capacitor 450 which is additionally affected by the rate of current flow from the power source 420 supplying the load 500, where a high rate of flow may cause in some embodiments an almost instantaneous charge rate on a capacitor 450. Where time is of primary concern series configurations of capacitors 450 at higher voltages from the power source 420 and current flow may be preferred, this embodiment would allow use in a parallel type discharge arrangement similar to a charge pump configuration. In additional embodiments where flowing current is more reduced or limited parallel arrangements of charging capacitors 450 with extended time periods of charging may be preferred, in further embodiments a high frequency switch (ing), between a state and or states, may also provide a stable output with minimal effect on flowing current and or the load 500.

Additionally, another switch (not shown) may be added to give a direct short connection between the switching capacitor 450 and power source 410, this may be used to cause the voltage to continue causing a force charging the capacitor 450. In some embodiments the power source 410 may be supplied directly from a DC current, in this embodiment could eliminate the input power converter (not shown), additionally improving the efficiency of the deflection converter. In many embodiments the operation of charging the capacitor 450 to a maximum state will not be beneficial, and instead cause challenges with operational loads 500, wherein an operating range may be more preferred to allow continuous operation of devices and loads 500 without a large fluctuation in operating characteristics.

Operation can be across the full range of voltages, the in-circuit capacitor 450 may be operated over a range or power band that utilizes the increased energy and reduces the charging time, effectively increasing the amount of energy benefit over a given period of time. This is due to the capacitor 450 being charged at a low initial resistance, then being introduced at the power sources 420 voltage so the operational voltage and resistance symmetry operates automatically in the most efficient manner possible this is do to the exact matching and coupling of the instantaneous change between the power source current 420, capacitor 450 energy state and resistance.

In some embodiments the operation of charging the capacitor 450 may benefit by the use resistance for as one non-limiting example current limiting, additionally resistance may be used to divert only a portion of the flowing current 420 which in embodiments with a high voltage and current flow may be beneficial and in certain embodiments necessary, a few non-limiting examples resistances may include a varistor or voltage dependent resistor, potentiometer and or controlled by a servo motor, or arrangement of different resistors 340 and resistances controlled by switches and or transistors 350.

In the preferred embodiment a Supervisory IC "integrated circuit" 600 is used to sense the voltage on the low side and or output of the capacitor 450 while charging, which is used to initiate a low current state and or send a signal to the NE555 timer 530 which is configured in a monostable configuration, the NE555 timer 530 sends a signal to the LM4017 Decade Counter 560 which controls a transistor 350 controlling the relay 490, though is some embodiments the relay 490 may not be used as the transistor 350 and or transistors could control the power supply current 420 directly, as well as the LM4017 560 could be replaced with for instance a flip-flop and or not used as switching could be directly driven with a controller and or digital logic and or logic levels. The supervisory IC 600 sends a signal to the NE555 530 timer when the voltage output from the capacitor 450 reaches the desired voltage, determined by the desired charge that is stored on the capacitor 450 after charging, less the power supply 420 currents voltage state that is entering the capacitor 450. The supervisory IC 600 may also be replaced with over/under voltage reset IC's and may also utilize Zener diodes and resistor 340 combinations in conjunction with voltage sensing devices with for instance comparators and or op-amps and or reflective feedback as well in some embodiments an analog to digital converter may be used and allow digital sensing and or control. The output current travelling to the load 500 may be converted to a desired voltage and or current through the use of a converter and or inverter, such as a boost converter/inverter 650 and or inducing a controlled current in a transformer (not shown), and may additionally utilize a voltage regulator 330 or not, that may utilize capacitors 360 thought the voltage regulator may not be required in many embodiments because the voltage of the circuit may be of a higher potential then the desired charge point of the capacitor 450 as well as the output current may be routed through a power converter for stabilization.

Additionally some embodiments may utilize pluralities of deflection converters and or capacitors 450 and or electrostatic storage devises 450, either in series and or in parallel or a combinational arrangement of both, and different sizes of capacitors 450 may be utilized to increase the time rate of charge conversion and or extraction in the circuit for instance a series of capacitors 450, wherein each capacitor 450 operates at a lower overall combined capacitance increasing voltage tolerance and providing equal current through each capacitor 450 and the circuit to increase charging speed and or frequency.

Additionally consecutive capacitors 450 may not necessarily need in series arrangements instead the capacitor(s) 450 operation could be timed to operate at different switching points in time, the ideal operation of this configuration could have a single or plurality of capacitors 450 being charged while reducing circuit voltage while simultaneously a single or plurality of additional switching capacitors 450 are not connected or charging and having no effect on circuit voltage, this operation could operate while not effecting the load 500 if the output to the load was compensated for will a non-limiting example of a converter for instance a boost converter and or inverter 650, wherein current rate would increase through the capacitor 450 providing for an increased capacitor 450 charge rate.

The operation of the circuit in the preferred embodiment is designed to allow automation of the deflection converter within a predetermined operating range; this may be accomplished by utilizing a supervisory IC's 600 or reset/set reset IC's, though a comparator and or op amp may be used in some embodiments that may utilize feedback and hysteresis and or a Schmitt trigger. This configuration allows the output current that is continually decreasing voltage after the capacitor 450 supplying the load 500 to be measured and compared against a reference voltage 290. The reference voltage is a predetermined and or controlled voltage that is used to provide a point in which the switching of a capacitors 450 out of the circuit is triggered. This reference point could be determined by a number of factors including capacitor 450 voltage rating and or capacity and or circuit voltage requirement and or power source 420 cut out and or operation limit voltage and or oscillation frequency requirement and or circuit tolerance to fluctuations and sensitivity to fluctuation, ripple or noise just to name a few non-limiting examples.

This operational method is advantageous because the output current is not the primary determent for activating the operation of switching the capacitor 450, instead the circuit voltage is the determining factor in the operation cycle, and as such this circuit design can be utilized in many different devices from high current consuming devices to devices that consume only a small amount of current without negatively affecting the device or loads 500 operation, though in some embodiments of predictable or set current a current measurement or predetermined volume may be used to trigger switching operation.

The operation of an automated circuit provides for a controllable system to effectively utilize the positive benefit and maximum efficiency charging a capacitor 450 in a straight forward uninterrupted operation. The input power source 410 is connected to a supervisory IC 600, which may additionally be a comparator with a Zener diode of appropriate value and or a voltage regulator or voltage reference, to tie down the voltage reference detected by the comparator (not show) to a non-floating value; in some embodiments a floating voltage for reference may be preferred, in some embodiments the reference voltage would be allowed to float as the dc power source 430 voltage fluctuated this could allow a moving voltage range while charging the capacitor 450 while for instance a battery is discharging through its operable power range or band. In additional embodiments a comparator (not shown) in some embodiments is in an inverting configuration so that when the voltage is being compared against the reference voltage drops below the reference voltage 290, the comparator sends out a signal and or stops conducting current, in the preferred embodiment this action is accomplished with a supervisory IC 600, to the NE555 timer 530. In some embodiments instead of an inverting configuration operation it may be beneficial to use a non-inverting configuration and operation, or additionally some embodiments may benefit by utilizing multiple pluralities of comparators (not shown) which for in the case of utilizing two comparators (not shown) could operate within a window of operation, wherein one comparator is in an inverted configuration and the other comparator (not shown) is in a non-inverting configuration and the capacitor 450 charging operates within a voltage window or range, which could be greatly beneficial if multiple circuits or loads 500 utilized a plurality of comparator windows to operate in each of their desired voltage ranges, while the capacitor 450 charging is operating and fluctuating which causes an increase and decrease in circuit voltage potentials, effectively utilizing an optimal power window throughout the capacitor 450 charging cycle.

The voltages sensed by the supervisory IC 600 can be controlled using resistors 340 as well as potentiometers 380, and or feedback, which can be greatly beneficial in controlling operating characteristics and voltage ranges to very accurate measurements, as well as utilizing hysteresis to create a buffer or filter gap between the two thresholds of an op-amp (not shown) sensed voltages 290, this introduction of hysteresis can be greatly beneficial as it can reduce or eliminate false triggering or jitters that may become apparent in the operation of the circuit and or op-amp and or relay(s) 490, which can become quite predominant with lower currents and slow voltage transitions. This false triggering can cause the operation of the circuit to cease and or be disturbed and as such methods to overcome this operational challenge are paramount, different methods to overcome jitters and false triggering include hysteresis, reducing switching capacitor 450 capacitance to cause an increase speed of voltage transition, operating the control circuit on a different power supply 410 to remove any noise and or interference to "clean up"/isolate the AC power source 420.

Measurements can be used to create high frequency switching, as well as a full range of switching speeds and voltage levels both for output to a load 500 or within a capacitor 450, which in some embodiments may utilize a prolonged period between switching.

The output current controlled by the supervisory IC 600 is sent and electrically connected to a NE555 timer 530, the NE555 timer 530 is used to create a uniform square wave with both rising and falling edges, which in some embodiments may utilize an operational amplifier for the voltage comparison and may additionally use a number of different methods to facilitate the a trigger point to initiate or control the act of switching the capacitor(s) 450.

The NE555 timer 530 configured as monostable or "one shot" configuration accepts the signal and or current state change from the supervisory IC 600 and sends out a square wave signal pulse in this embodiment to a LM 4017 decade counter 560, the decade counter 560 is used to control a transistor 350 through a resistor 340 that controls a relay 490 which may contain a "fly back diode" 300 to suppress voltage spikes during switching, to facilitate the action of switching a capacitor 450 into an operating circuit. Though a number of devices such as flip flops, set reset circuits, latching circuits, and or counting or stepping circuits may be used, in this embodiment the LM 4017 decade counter 560 is used to create an on state and off state step, as the voltage drops below the reference voltage then hold the relay 490 in an on or off position, in this embodiment a double pole double throw relay 490, is held in either a normally open or normally closed position which changes the circuit orientation and connects/inserts the capacitor 450 into the current stream.

The output current is used as the voltage being monitored 290 as it is the current that's voltage is affected by the capacitor 450 charging operation, the control current is accomplished by electrically connecting this point in the circuit with the Vin (Voltage IN) of the supervisory IC's 600 which after the switch occurs creates a reducing voltage in the output power line which is additionally sent to the supervisory IC 600 which senses the lowering voltage and then changes its output state, it should be noted the LM4017 decade counter 560 maintains its output pin state even after the signal from the NE555 530 has ended, the duration of which may be controlled by varying the control resistor 340 and capacitor 360. In some embodiments the LM 4017-decade counter 560 may not be necessary as the signal from the NE555 timer 530 or the comparator or an operational amplifier (not shown) or additional voltage sensing devices.

The preferred configuration of the NE555 timer 530 in the circuit is in a mono-stable or "one-shot" configuration though in different embodiments it is possible to utilize different configurations including astable, bistable, multivibrator or triggered and could be used as a direct drive to the switching means of the capacitor 450, which may also include controllers, microcontrollers and other directly driven outputs for control. The LM 4017 decade counter 560 in this embodiment is configured to operate as a 1-2 counter, specifically the decade counter 560 operates to count between the output pins 0 pin and the 1 pin with the 2 pin being the reset pin, this is to allow the relay 490 to alternate between being in an off position, or on position based on a single signal sent out from the supervisory IC 600 and or comparator (not shown) each time the voltage crosses below the VRef or "voltage reference", this crossover point would be the point in which the capacitor 450 is charged to the desired voltage and or the charging of the capacitor 450 commencement point when the current is channeled through the capacitor 450.

This on off operation of the transistor 350 and relay 490 is accomplished by electrically connecting to only one of the LM 4017 decade counter 560 output pins, though in some embodiments different output pin arrangements could be used in conjunction with a relay 490, a switch or switches to facilitate the operation of changing the in circuit orientation of the capacitor 450, and or connecting the capacitor 450 to different circuits and or connecting the deflection converter to different capacitors and or the same capacitors 450 at different points in time.

In this embodiment when the DPDT "double pole double throw" relay 490 is activated by the transistor 350 allowing current to activate its coil and move into the second normally closed position which for simplicity will be referred to as the normally open position, the current is allowed to travel into the relay 490 and into a transformer 640 and bridge rectifier 310 that are optional and may instead be substituted for additional rectification and or converting systems for instance non-limiting examples of switch-mode power supplies, AC-DC converter, rectifier, mosfet "metal-oxide-semi-conductor field-effect transistor" and or transistor rectification, then into an optional voltage regulator 330 though not preferred and then into the charging capacitor 450 to charge the capacitor, then into the power converter/inverter 650, which has a return path to the relay 490, the power converter and or inverter 650/48 then has an electrical connection and path for current to travel to and powering a load 500, the voltage in the preferred embodiment is monitored by under/over voltage supervisory IC's 610, that controls the trigger point of the deflection converter to change the relays 490 state to the normally closed position when the voltage after the capacitor 450 reaches the desired voltage and deactivate the transistor 350, though the capacitors 450 voltage itself could be monitored to control the switch point and or the current and or the circuit voltage at multiple different points during operation.

When the DPDT relay 490 is not activated by the transistor 350 and remains in the normally closed position, the AC power supply current 420 then travels into and then back out of the relay 490 unobstructed in this embodiment, and then is connected to and powers a load 500, while the deflection converter remains in an off state and or standby state, and where the operation could be initiated by means of a number of switches 480 and or initiating means and or triggers, where the deflection converter 700 in some embodiments could maintain an inactive state until an initiation occurs, though in additional embodiments the deflection converter could remain in an active and or searching state to allow quick transition is a trigger or switch 480 activates the charging of a capacitor(s) 450 and or electrostatic storage device(s) and or device(s).

It should be noted that in this embodiment the capacitor 450 is located upstream from the load 500 though in other embodiments the load 500 and capacitor(s) 450 in circuit locations may be reversed or altered without departing from the benefit and operation of the disclosed invention.

Additionally though in this embodiment the current being monitored and sent to the supervisory IC 600 is located before the load 500 after the capacitor 450, it may be beneficial to sense the voltage in any number of positions within the circuit to optimize the device for specific applications and for different operating techniques and procedures, which may be made visual through the use of optional LED's "light-emitting diode" 370 and or output display. Additionally, filtering of noise may be of consequential importance in embodiments where a single power source 420 or shared power source is used in conjunction with a sensor or sensors controlling the switching action of capacitor(s) 450, and filtering may be accomplished with non-limiting examples of low pass active filter, high pass active filter, multiple sample comparison reference, low pass passive filer, high pass passive filter, Schmitt trigger, as well as additional stabilizer capacitors may be used to ensure during the transition periods of the relay 490 and or switches that the load 500 receives an uninterrupted supply of electrical current. Additionally, some embodiments may benefit from utilizing latching relays 490 and or switches to facilitate switching operations of the capacitor 450.

Additionally in some embodiments it may be possible and beneficial to send a single signal from any number of devices to facilitate the operation of switching the capacitor 450, wherein digital processing and or logic and or logic levels could be used to operate the switching 480/490 action and charging capacitor(s) 450 operation. This may be the case in for instance mobile devices where current levels are continuously monitored and implementation would only require a few additional components as in the capacitor 450 and switches 480, as all other operations are currently being accomplished by active systems on the device.

The benefit and operation of the deflection converter can be increased further by utilizing additional sequential capacitors 450, the operation of which presents its own challenges, the ideal embodiment for multiple sequential capacitors (not shown) that may be any number of pluralities or series configurations, and by operating for instance a second capacitor (not shown) within an operating range and specifically by utilizing a lower, the same, or a different capacitance for the second switching capacitor (not shown) that in some embodiments operates at a higher switching frequency, which in some embodiments may operate in this manner as multiple stages or nodes, and or may additionally be operated in a parallel fashion at the same voltage state, or at a different voltage state(s), stage(s), or step(s) and which may happen in some embodiments before the deflection converter 700 output power converter/inverter 650, or in additional embodiments operate as separate individual deflection converters 700 arranged in series and or parallel in the current stream.

The operational circuit current can operate in a number of different operations, the current can be regulated, both on the input of the circuit to stabilize the voltage monitoring and control portion of the circuit, as well as the output current may be additionally voltage regulated, or not, depending on specific applications and load 500 requirements and sensitivity, and or routed to power circuits based on the current state of voltage, for each circuit, maximizing the power and work product at that point in time. A circuit may benefit greatly by designing architecture to change a circuit's resistance during operation referenced as possible embodiments herein which may be accomplished with reference to the section "Resistance and Current Control". This resistance may be used to control the current and or voltage to ensure the desired output power at different stages of the capacitor 450 charging and or during operation of a varying potential and or current power supply 420 or source.

Included as possible embodiments a multitude of current and or voltage sensing and triggering techniques may be used and are referenced herein as possible alternate embodiments and are explained in the section "Initiating and Control Methods". As well in this embodiment a switch is used though in other embodiments a number of switching devices and methods may be used and are referenced herein as possible alternate embodiments and are explained in the section "Switching Methods and Devices", and may incorporate a management system or process and are referenced herein as possible alternate embodiments and are explained and referenced in the "Management Systems and Processes" section. A circuit may benefit greatly by designing architecture to change a circuit's resistance during operation and are referenced herein as possible alternate embodiments and are explained and may be accomplished with reference to the section "Resistance and Current Control". This resistance may be used to control the current and or voltage to ensure the desired output power at different stages of the capacitor operation, and or during operation of a varying potential and or current power supply or source, referenced herein are possible alternate embodiments and are explained and may be accomplished with reference to the section "Current Source and Power Supply". Additionally, the operation of the device and electrostatic storage device/capacitor 450 system and allow for a number of possible output current state and ranges referenced herein are possible alternate embodiments and are explained and may be accomplished with reference to the section "Output Characteristics". Though a management system 2 is described and referenced possible alternate embodiments are additionally referenced herein and are explained and may be accomplished with reference to the section "Integrated Circuits". Though a capacitor 450 for charging is referenced possible alternate embodiments are additionally referenced herein and are explained and may be accomplished with reference to the section "Storage devices". Though a generic load 500 is referenced possible alternate embodiments are additionally referenced herein and are explained and may be accomplished with reference to the section "Implementations" as well as the section "Applications".

Figure 3:
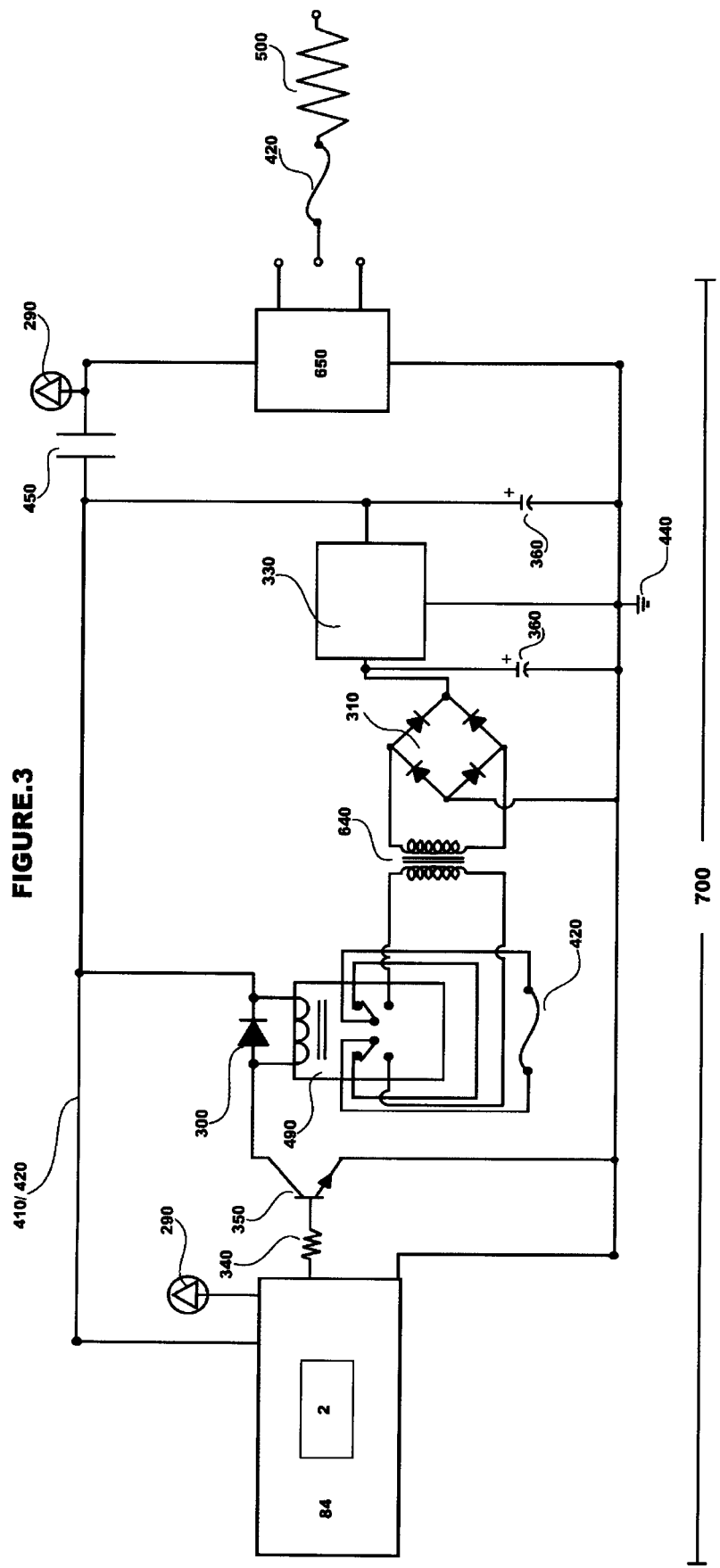
FIG. 3 Is an embodiment of the invention utilizing a management system and controller with an alternating current and configuration.

FIG. 3 is an embodiment of the invention utilizing and converting an alternating current 420 into a direct current power source 410/430 for use as a deflection converter 700, and then back into alternating current 420 to power a load 500, and though in this embodiment the alternating current 420 is converted through a transformer 640 and then into a bridge rectifier 310 which may be substituted for other methods and components for rectification referenced throughout this disclosure, and entirely to direct current 430 for charging a capacitor 450 and operational circuitry including relay 490, transistor 350, resistor 340, flyback diode 300, controller 84, management system 2 used for monitoring current voltage 290 and operation, and then AC current 420 powering a load 500. In additional embodiments the alternating current 420 does not need to be converted into direct current 430 instead the capacitor 450 utilizing the disclosed method could be implemented to offer the same benefit as in DC circuits if the capacitors 450 operation was timed to switch orientation within the circuit of an alternating current 420 before each alternation was to take place, or as a product of each alternation.

For example in an embodiment with an AC source 420 powering an AC induction motor (not shown) operating at a frequency of 50 hertz single phase, what this means is the current is a single alternating current 420 and it alternates at 50 alternations a second. With the disclosed method, if each alternation is considered to be a direct current source, between each alternation, then by utilizing a switch for the capacitor 450 it is possible to invert the charging and discharging of the capacitor 450 within each alternation of the main supply current 410 which because of the requirement of higher frequency operation a transistor for the switching operation is preferred, and in this embodiment an even higher efficiency may be possible.

Explaining this in operation, as the alternating current 420 is flowing in the positive sine of the alternation the capacitor 450, which is first charging the capacitor 450 and supplying a decreasing current and voltage to a load 500, then when the current begins to alternate the direction of the capacitor 450 is reoriented into the current stream to continue charging, this re-introduction can occur both within a single alternation, or may be accomplished within the next alternation, or completed cycle, wherein a single alternation can comprise the entire operation of charging and discharging/disconnecting the capacitor 450. Additionally, the charging may be accomplished over an entire cycle of the alternating current power source 420, where the capacitor 450 is charged in one half of the cycle and or both half's of the alternation and or after the alternation and or before, or additionally charged in both half's of the cycle and or the next operating cycle or multiple alternations/cycles.

In this embodiment the alternating current 420 is fed into a transformer 640 which depending on the input voltage and current may be either a step up, or step down transformer 640, in some embodiments no transformer is required where a power converter (not shown) may be implemented for instance a non-limiting example of a switch-mode power supply (not shown), the transformer 640 is then connected to a bridge rectifier 310 which in this example is a full wave rectification but may also comprise a half wave bridge rectifier (not shown) or again may not be necessary and or substituted for more efficient devices for instance rectification controlled by mosfet and or other transistors, which have been shown to operate at high efficiency's. The current is then routed through a voltage regulator 330 which is optional in this example an voltage regulator IC is used which could regulate the voltage to a range of desirable levels, which could also include a controlled regulator to actively change the desired operating voltage fed to the circuit, and which could include a number of voltage regulators 330 and or plurality for use with multiple circuits and or capacitors 450 and or deflection converters, with additional capacitors 450, in this embodiment used as decoupling and or filtering capacitors 360 are used. The current located after the 450 then supplies a main power line used as the sensing voltage 290 and or current supplied to the load 500, in this example a separate voltage regulator (not shown) is not used, though in an exemplary embodiment a separate power source (not shown) and or voltage regulator (not shown) and or resistor(s) or variable resistor 340 may be used to supply sensitive operating circuitry with a smooth stable power source 410, additionally in the preferred embodiment the output may be controlled by a power converter and or power inverter 650/48 and or power control, converter, inverter, booster, reducer/buck, and or electronic either digital or analog controller to provide a desired output current and voltage to a load 500, which may be a direct current 430, the preferred alternating current 420, pulse width modulated and or variable current.

In this embodiment a management system 2 and controller is used to carry out the functions and operation of the deflection converter which may be substituted with a number of control systems, in this embodiment the current sensing operation is converted into a digital format to allow ease of operation and accuracy controls that may use program codes and or algorithms. The controller 2 controls a transistor 350 that controls a relay 490 which may incorporate a "fly back diode" 300. The relay 490 controls the operation of switching the capacitor 450 and it's in circuit orientation and connection to current supplying a load 500. In this embodiment voltage sensing, measurement, and triggering the switching of capacitor(s) 450 is accomplished with analog to digital connection and conversion (not shown), though in some embodiments may be accomplished by using a current and voltage limiting connection that may compose a resistor and or resistance divisible into a digital count for conversion of voltage state and current, and or may include an analog to digital and or digital to analog converter and or measuring devices such as non-limiting examples of ammeter(s), voltmeter(s), pyrehelometer(s). The capacitor 450 outputs current into a relay 490 and or a system of or a transistor(s) 350 that control the current and voltage into a load(s) 500, and or to a ground potential 440 or lower potential.

This configuration of transistors 350 in additional embodiments could be used to allows the current to travel into desired resistance paths based on a point in time, and or the voltage of the capacitor 450 and or output current, the reason for this is the deflection converters benefit is realized over the range of charging the capacitor 450. This charging in certain embodiments may cause a wide range of circuit voltages and when applied to a load 500 being a fixed resistance will cause a decrease of circuit current, as a factor of Ohm's law, that being an decreased voltage applied to a fixed resistance causes an decrease in current, this would be the case in embodiment that do not use an output converter and or inverter 650 to stabilize the current powering the load 500.

This decreased current and its effect on decreasing circuit power may be of great usefulness in certain embodiments, specifically for power savings by reducing circuit voltage and thereby reducing circuit current if in a circuit with fixed resistance, though for a number of embodiments the benefit of the deflection converter operation would more greatly be realized by reducing voltage swings, so in these embodiments the amount of circuit current may be controlled by a power converter and or inverter 650/48 or power controlling means, to control the output current supplying a load 500. This in some embodiments may operate by controlling switches such as transistors and as the output voltage is reduced and or reducing, activate different transistors and or switches and or with inductors and or with diodes and or with capacitors, to offer an increased frequency to the output current to reduce and or reverse the declining voltage and allowing circuit voltage and current to remain consistent, which may be across any plurality of switching systems and or an operational range controlling a the device(s) and or load(s) 500. Additionally, the requirements and or current frequency and or capacitor 450 voltage state may be controlled to precisely meet the operational requirements and determined voltage range of a specific application(s) and or system and or load(s) 500.

In certain embodiments a simplified system and operation can be greatly beneficial for ease of use, cost and operation wherein the specific application has consistent energy consumption, additionally this operation and direct drive configuration could also be used in some embodiments to directly drive a latching switching device, for instance a latching relay 490, and or a partial rotation of a commutator switching apparatus wherein brushes or contacts make an electrical connection to an alternate an electrical configuration and or circuit configuration(s) for operating the capacitor(s) 450 charging and switching operation.

Additionally, a control source 410 and or controller 84 may drive a latching electronic device for instance an IGBT transistor "insulated-gate bipolar transistor" that if the gate on the IGBT is not pulled down with a pull down resistor then after the gate is "charged" would remain in an on state until a pull down or discharge of the gate occurs, and in this example many different methods could be used to operate this device in a timed, consistent or periodic manner for instance a separate pull down transistor or high value resistor and or a current state change sent from the controller 2.

Included as possible embodiments a multitude of current and or voltage sensing and triggering techniques may be used and are referenced herein as possible alternate embodiments and are explained in the section "Initiating and Control Methods". As well in this embodiment a switch is used though in other embodiments a number of switching devices and methods may be used and are referenced herein as possible alternate embodiments and are explained in the section "Switching Methods and Devices", and may incorporate a management system or process and are referenced herein as possible alternate embodiments and are explained and referenced in the "Management Systems and Processes" section. A circuit may benefit greatly by designing architecture to change a circuit's resistance during operation and are referenced herein as possible alternate embodiments and are explained and may be accomplished with reference to the section "Resistance and Current Control". This resistance may be used to control the current and or voltage to ensure the desired output power at different stages of the capacitor operation, and or during operation of a varying potential and or current power supply or source, referenced herein are possible alternate embodiments and are explained and may be accomplished with reference to the section "Current Source and Power Supply". Additionally, the operation of the device and electrostatic storage device/capacitor 450 system and allow for a number of possible output current state and ranges referenced herein are possible alternate embodiments and are explained and may be accomplished with reference to the section "Output Characteristics". Though a management system 2 is described and referenced possible alternate embodiments are additionally referenced herein and are explained and may be accomplished with reference to the section "Integrated Circuits". Though a capacitor 450 for charging is referenced possible alternate embodiments are additionally referenced herein and are explained and may be accomplished with reference to the section "Storage devices". Though a generic load 500 is referenced possible alternate embodiments are additionally referenced herein and are explained and may be accomplished with reference to the section "Implementations" as well as the section "Applications".

Figure 4:
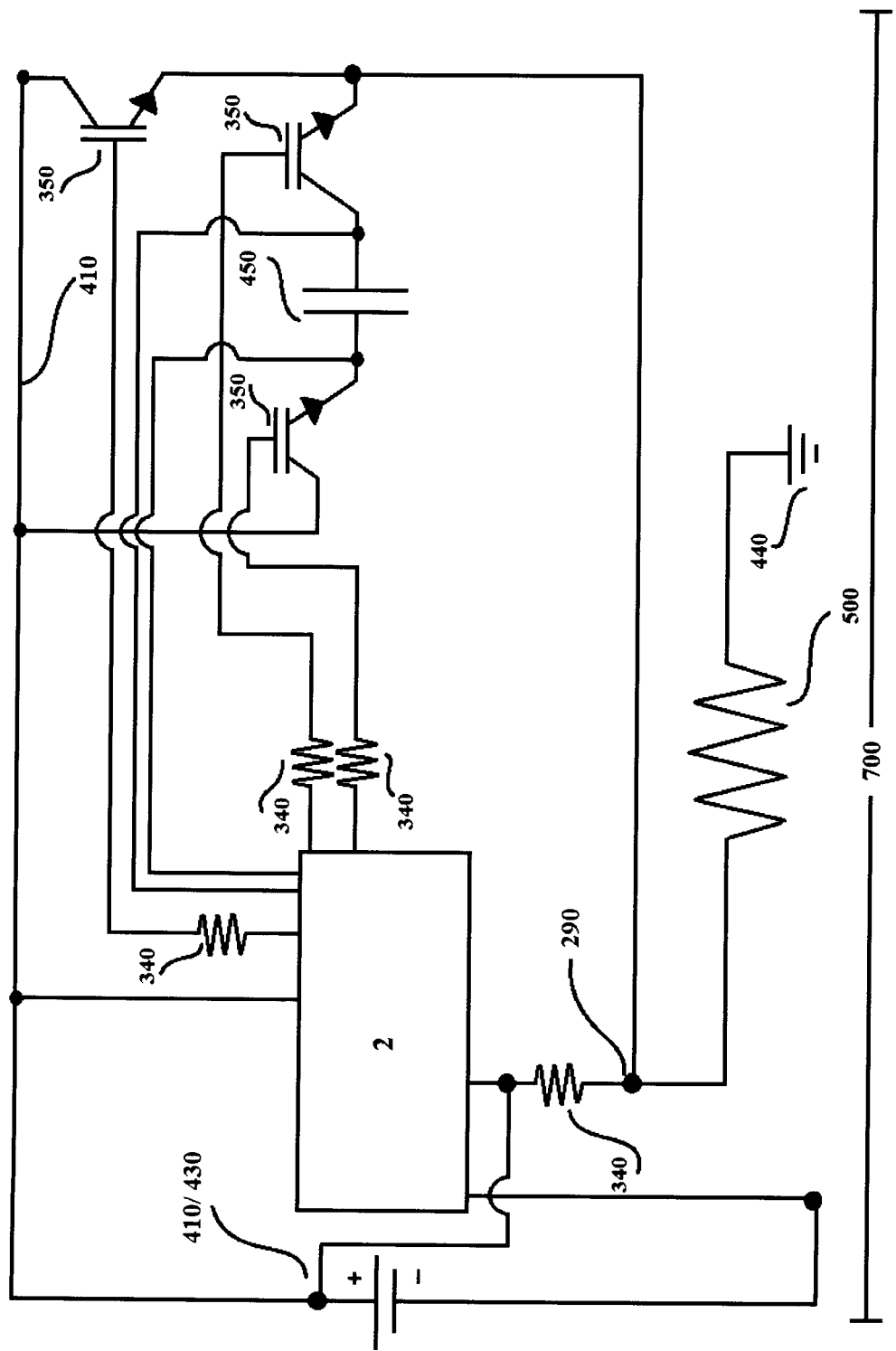
FIG. 4 Is an embodiment of the invention demonstrating the preferred digital embodiment with a direct current power source and configuration.

FIG. 4 is an exemplified embodiment of the invention utilizing a simplified direct current power source 430 and configuration, for use as a deflection converter 700 and demonstrates the preferred digital embodiment of the device utilizing a management system 2, direct current power source 430 and configuration, for use as a deflection converter 700. This simplified configuration utilizes a DC power source 430, the current may then be routed through an optional voltage regulator (not shown), the current then supplies a main power line 410 which in some embodiments may be used for sensing the voltage 290 and or current supplied to the load 500. In this embodiment a management system 2 utilizing a controller 84 is used to control the operation of the deflection converter 700 with transistor(s) 350 as the switching mechanisms for operation. The transistors 350 control the operation of the charging capacitor(s) 450 and it's in circuit orientation supplying current to a load 500 and to ground 440 and or a lower potential. In this example voltage sensing is accomplished with a pull up sensing resistor 340 from the electric feed after the charging capacitor 450 and before the load 500. The management system 2 configuration utilizes a DC power source 430 though in alternate embodiments may utilize an alternating current power source or sources (not shown) or varying source such as a electrostatic storage device (not shown). The current may be routed through an optional voltage regulator (not shown) or there may exist multiple separate power sources or "lines", and in additional embodiments a variety of switching devices may be used to control power sources 430 and or lines. The current then supplies a main power line source 430 which in some embodiments may be used for sensing the voltage 290 and or current supplied to the load 500, in different embodiments the management system 2 and or controller 84 may control and or drive a switch and or relay 490 that controls a main power line 430 or lines.

In this embodiment the management system 2 sends a signal to a transistor(s) 350 though in other embodiments a variety of voltage sensing devices may be used to send information to the management system 2 for control determinations and command allocations, which in additional embodiments may control a relay 490 through a resistor 340. In this example voltage sensing 290 is accomplished with an analog to digital converted (not shown) contained within the management system 2 from the electric feed after the switching capacitor 450 and before the load 500 by means of a pull up voltage sensing resistor 340.

Depending on the particular application and embodiment operation can be controlled by the management system 2 to produce the benefit of charging the capacitor 450 in the circuit for predictable or specific actions, load 500 requirements and or current frequency and or state in a real time active state, which may include user interactions in live time or predetermined states. In some embodiments as referenced herein a consistent continuous operation controlled directly from the management system 2 could provide the operation of switching and or charging the capacitor 450 to precisely meet the operational requirements and determined voltage range of a specific application. This system and operation can be greatly beneficial for ease of use, cost and operation wherein the specific application could encompass a wide range of devices and operational systems within a single device or multiple devices and or circuits.

Additionally, this operation and configuration may be used in some embodiments to operate pluralities of capacitors 450 wherein for instance one embodiment could utilize the management system 2 in an electronic device such as a smart phone, the operation of a smart phone requires complex layers of electronics and a multitude of regulated and independent power supply lines 410 and systems and circuits. In this embodiment a management system 2 could be used to control a high plurality of capacitor 450 charging systems (not shown) or "deflection converters" that operate independently or conjunctly, wherein frequency/capacity/voltage operational range/current/and additional determinants may significantly vary between each system, which could utilize different points in time of a singular, or plurality of capacitors 450 during operational voltage ranges which in the case of electronics such as smart phones reduce power consumption significantly this is because capacitors are use extensively for numerous operations and systems and many of these system utilize very inefficient RC "resistor-capacitor" circuits where the disclosed system and method could greatly reduce wasted energy in these devices. Additionally, detection methods and switching control may also significantly vary, in some embodiments it may be required to operate additional pluralities of management systems 2 and management system 2 design configurations. Management system 2 pluralities may be needed to ensure proper operation of the capacitor 450 and or capacitors (not shown), in these embodiments additional management systems 2 may be needed to ensure that false switching caused by signal noise, fluctuation and or capacitor 450 charging operations that may cause ripple and noise in the power system and or supply 410 which may then be avoided.

This may be accomplished by independently operating power systems 410 and or capacitors 450, controlled by a management system 2 or management systems (not shown) which may include an extremely high number of pluralities, for instance in the case of a single microchip may contain billions of transistors 350 controlling millions of commands and systems. In some embodiments the management system 2 may be utilized to operate with memory for instance non-limiting examples ROM or "read only memory" and or RAM "random access memory". In additional embodiments a variety of management systems 2 and devices may be used to This embodiment is particularly suitable for systems employing digital logic and or logic levels and operation as all of the system controls are electronic and thus can be operated at high frequency state thus allowing a reduction in capacitance of the charging capacitor 450 as well as its physical size and footprint making it more suitable for non-limiting examples of electronics, personal electronics and implantable devices.

Included as possible embodiments a multitude of current and or voltage sensing and triggering techniques may be used and are referenced herein as possible alternate embodiments and are explained in the section "Initiating and Control Methods". As well in this embodiment a switch is used though in other embodiments a number of switching devices and methods may be used and are referenced herein as possible alternate embodiments and are explained in the section "Switching Methods and Devices", and may incorporate a management system or process and are referenced herein as possible alternate embodiments and are explained and referenced in the "Management Systems and Processes" section. A circuit may benefit greatly by designing architecture to change a circuit's resistance during operation and are referenced herein as possible alternate embodiments and are explained and may be accomplished with reference to the section "Resistance and Current Control". This resistance may be used to control the current and or voltage to ensure the desired output power at different stages of the capacitor operation, and or during operation of a varying potential and or current power supply or source, referenced herein are possible alternate embodiments and are explained and may be accomplished with reference to the section "Current Source and Power Supply". Additionally, the operation of the device and electrostatic storage device/capacitor 450 system and allow for a number of possible output current state and ranges referenced herein are possible alternate embodiments and are explained and may be accomplished with reference to the section "Output Characteristics". Though a management system 2 is described and referenced possible alternate embodiments are additionally referenced herein and are explained and may be accomplished with reference to the section "Integrated Circuits". Though a capacitor 450 for charging is referenced possible alternate embodiments are additionally referenced herein and are explained and may be accomplished with reference to the section "Storage devices". Though a generic load 500 is referenced possible alternate embodiments are additionally referenced herein and are explained and may be accomplished with reference to the section "Implementations" as well as the section "Applications".

FIG. 5 is an diagram showing potential implementation methods and devices in which the deflection converter 700 may be utilised an or implemented. The alternating current power source 420 in the case a main utility grid may be directly connected to a deflection converter 700 at multiple different nodes throughout the power distribution grid/system. In this case one embodiment of the deflection converter is moved up the traditional power distribution system by one node skipping the transformer 640 that in normal operation steps down the power system voltage to lower levels generally to 120-240 volts for end customer use. This embodiment is beneficial lowering losses in the process of distributing power, this is because transformers 640 traditionally operate at between 4-6% losses and by moving up the distribution system it is possible to eliminate some and or all the losses associated with these transformers 640 which could include moving up in some embodiments multiple nodes skipping multiple transformers 640 and losses associated to them. This operation is beneficial over traditional systems because the voltage in some embodiments does not need to be stepped down and can be utilized at these higher voltages for charging electrostatic storage devices (not shown) and or capacitors (not shown), this is because the deflection converter 700 technology is designed to insert the storage device into the circuit and then remove the storage device from the circuit within each devices tolerance range and or combine tolerance range and or ranges. Additionally, the act of moving up the power distribution system allows the deflection converter 700 technology to utilize a larger volume of current flow, this is due to the fact that these "main lines" supply multiple loads 500 and at each step that base of operating loads 500 increases. This is beneficial to the deflection converter technology because the amount of current flowing into and out of the deflection converter 700 directly affects the time rate of charging of an electrostatic storage device for instance a capacitor, which in some embodiments could be used to charge large capacity devices for instance non-limiting examples of an electric vehicle, particle accelerator, laser, aerial vehicle/plane/device almost instantaneously. This method of implementation differs from all traditional systems of power charging conversion in that; for instance batteries can only handle a certain quantity of charging over a given period of time, and if quantity of charge was to be maximized, as in the present disclosure, then damage would occur to the battery and or storage device.

Additionally, when charging similar devices such as capacitors the ability to charge this device in an efficient manner is employed by a system of constant current slowly raising a minimized voltage and dependent upon the amount of current flowing into the device referred to as a ramp up constant current power source. This method is a ground up approach and as such voltage needs to be transformed to near zero volts which causes inefficiency's, and because the voltage is transformed to this near zero voltage no obvious advantage of moving up the power supply system would become apparent or present itself. This is because even moving up the distribution system the voltage would still need to be stepped down to near zero volts for use, employing this method not only causes power loss and efficiency losses it also greatly extends the time rate of charging making this system far less beneficial than the disclosed system and method.

The benefit of the disclosed system and method may be employed in a number of beneficial ways and or connections and or charging methods. Some different deployment methods could include in one embodiment the use of a flying aerial device 730, a non-limiting example of a drone 730 may be used a number of way in conjunction with deflection converter 700 technology and may include; a deflection converter 700 being built directly into the device for self-charging when connected to a power source 410 and load 500, and or deployed to charge other devices including but not limited to other aerial devices 730 through for instance a non-limiting example of a contact point or points. The operation of charging other devices could be implemented by means of contact and or wireless and or coupling and or connecting to each device and or a deflection converter(s) 700, which in one embodiment could utilized a drone 730 with a built in deflection converter 700 with a high and or higher capacity power source utilized to charge the device needing charging through direct contact and or connection and or wireless connection, as well the drone 730 in some embodiment could maintain an electrical connection while charging the secondary device, which may in some non-limiting examples be implemented by a direct wire connection to a power supply and or distribution system, and or wireless connection which may include non limiting examples of drones 730, flying aerial devices, planes, flying cars, sensors and or non flying devices and or equipment and or machinery. One of the main benefits of the device is its ability to charge devices such as capacitors in an expedited almost instantaneous fashion, this is very advantages to many applications including devices such as cell phones and mobile devices, these devices could utilize a number of different implementation methods and some embodiments may including being built into the device and or allowing a connection to a deflection converter through a number of different connection mechanisms such as touch, wireless, contact, a traditional plug and or even swipe.

Some embodiments may deploy the deflection converter 700 in a household and or commercial setting utilizing a tap-in point 470 to their electrical system that may in some embodiments utilize a circuit breaker and or cut-off and or safety system to shut of power to the deflection converter 700 and or device. This access and or connection point 470 could be used to create a single and or plurality of deflection converter 700 access points 470 and or hubs within an electrical system, this would be very advantages in operating conditions because as capacitor technology improves could allow the transition to devices entirely and or partially powered by capacitors and when utilized with this system and method could allow user to charge devices safely in seconds rather then hours.

Included as possible embodiments a multitude of current and or voltage sensing and triggering techniques may be used and are referenced herein as possible alternate embodiments and are explained in the section "Initiating and Control Methods". As well in this embodiment a switch is used though in other embodiments a number of switching devices and methods may be used and are referenced herein as possible alternate embodiments and are explained in the section "Switching Methods and Devices", and may incorporate a management system or process and are referenced herein as possible alternate embodiments and are explained and referenced in the "Management Systems and Processes" section. A circuit may benefit greatly by designing architecture to change a circuit's resistance during operation and are referenced herein as possible alternate embodiments and are explained and may be accomplished with reference to the section "Resistance and Current Control". This resistance may be used to control the current and or voltage to ensure the desired output power at different stages of the capacitor operation, and or during operation of a varying potential and or current power supply or source, referenced herein are possible alternate embodiments and are explained and may be accomplished with reference to the section "Current Source and Power Supply". Additionally, the operation of the device and electrostatic storage device/capacitor 450 system and allow for a number of possible output current state and ranges referenced herein are possible alternate embodiments and are explained and may be accomplished with reference to the section "Output Characteristics". Though a management system 2 is described and referenced possible alternate embodiments are additionally referenced herein and are explained and may be accomplished with reference to the section "Integrated Circuits". Though a capacitor 450 for charging is referenced possible alternate embodiments are additionally referenced herein and are explained and may be accomplished with reference to the section "Storage devices". Though a generic load 500 is referenced possible alternate embodiments are additionally referenced herein and are explained and may be accomplished with reference to the section "Implementations" as well as the section "Applications".

FIG. 6 is an diagram showing potential implementation methods and devices in which the deflection converter (not shown) may be utilised an or implemented. In this diagram the deployment of deflection converter 700 technologies are deployed to be utilized for a non-limiting example of transportation systems, this deployment could operate through a wireless charging 710 and or contact system 720 of charging. The advantageous benefits of the disclosed system and method could be of great consequential importance and benefit when deployed and utilized within transportation infrastructure and systems. This benefit could be realized by allowing wireless charging 710 of vehicles and or contact charging 720, this operation because of the instantaneous nature available to the disclosed system and method in some embodiments could allow "on the go" charging. This type of "on the go" charging is superior to current technology because currently no viable way to charge non-limiting examples of vehicles exists to date. Current electric vehicle charging systems generally required 30 minutes to 2 hours to completely charge a vehicle and in order to deploy "on the go" charging would require potentially miles of a charging deployment operation, this has proven to be clearly non-viable and even the most advanced ultra fast charging stations still require at least 6-10 minutes to charge a vehicle, this factor ensures with the current methods that no viable way to charge a vehicle while in use exists, or could be possible, and or developed with the limitations that clearly present themselves with these systems.

The deflection converter 700 technology is far superior to these traditional systems, in that, because of the near instantaneous charge rate available when utilizing deflection converters 700, could allow multiple paths to "on the go" vehicle, transportation including aircraft charging and or aerial charging. This could be accomplished through wireless charging 710 as well as a connection-based charging 720, and or a hybrid of both wireless and connection charging, which in some embodiments could allow charging to occur while a device is in operation and or transversing an area. This could be implemented in non-limiting examples of vehicles with direct connection equipment and or features, for instance a vehicle could have conductive material implanted in a vehicle tire that if contact with a deflection converter 700 contact point 720 on a roadway could allow charging, that could be designed for a specific charge rate and or a given time of charging. Additionally, the vehicle could have a device and or devices that are able to make a connection to a deflection converter 700 and or power source, if the vehicle itself had build in deflection converter technology 700 and or a deflection converter was deployed as a charging station, which could be for instance a non-limiting example of an extendable charging arm(s) and or device. Additionally, wireless charging cause could be of great advantage and if implemented in an effective manner could utilize a multitude of deployable methods including for instance wall and or side mounted transmitters, a tunnel deployment method, which could also include a blended system for instance transmitters and a direct vehicle connection.

Included as possible embodiments a multitude of current and or voltage sensing and triggering techniques may be used and are referenced herein as possible alternate embodiments and are explained in the section "Initiating and Control Methods". As well in this embodiment a switch is used though in other embodiments a number of switching devices and methods may be used and are referenced herein as possible alternate embodiments and are explained in the section "Switching Methods and Devices", and may incorporate a management system or process and are referenced herein as possible alternate embodiments and are explained and referenced in the "Management Systems and Processes" section. A circuit may benefit greatly by designing architecture to change a circuit's resistance during operation and are referenced herein as possible alternate embodiments and are explained and may be accomplished with reference to the section "Resistance and Current Control". This resistance may be used to control the current and or voltage to ensure the desired output power at different stages of the capacitor operation, and or during operation of a varying potential and or current power supply or source, referenced herein as possible alternate embodiments and are explained and may be accomplished with reference to the section "Current Source and Power Supply". Additionally, the operation of the device and electrostatic storage device/capacitor 450 system and allow for a number of possible output current state and ranges referenced herein are possible alternate embodiments and are explained and may be accomplished with reference to the section "Output Characteristics". Though a management system 2 is described and referenced possible alternate embodiments are additionally referenced herein and are explained and may be accomplished with reference to the section "Integrated Circuits". Though a capacitor 450 for charging is referenced possible alternate embodiments are additionally referenced herein and are explained and may be accomplished with reference to the section "Storage devices". Though a generic load 500 is referenced possible alternate embodiments are additionally referenced herein and are explained and may be accomplished with reference to the section "Implementations" as well as the section "Applications".

Integrated Circuits

Integrated circuits or "IC's" are arrangements of electronic components integrated into generally a single package or grouping, the design and function of which can vary significantly and lists into the hundreds of thousands of designs. In the disclosed system and method an IC may be used to accomplish the action of switching the capacitor and its operation including charging and or discharging and or connection and or disconnection, and control by means of the deflection converter. The wide combinational arrangements and component mixes of IC's and their continuous development and repackaging defeat the specific inclusion and reference to specific IC's, their use and application in the disclosed system and method other than example systems and operation, and as such any reference to a specific IC or device is made with the assertion that the function or variation of the function the IC's preforms and or is intended to preform may be accomplished in a multitude of combinational arrangements and designs, the resultant function of which is in fact the invention and disclosure, and that the specific IC that preforms or is intended to perform the function, or variation of the function is arbitrary, and any variation and or combination of components and or IC's that facilitate the action and or operation and or produce the intended result of the disclosed system and method are heretofore incorporated as part of this disclosure and are referenced herein as possible embodiments.

Initiating and Control Methods

Options for initiating and control methods to initiate and or control operations and or a connection to of a deflection converter or related/connected systems and components may include non-limiting examples of any singular or combinational arrangement referenced as possible embodiments of the disclosed invention of the following non-limiting examples; reed switch next to a high current conductor, hall sensors, opto-coupler across a sense resistor, a coil driven with a feedback loop and sensed by a hall sensor, analog to digital/digital to analog converter(s), wheatstone bridge, voltage sensing relays, capacitive voltage sensors, resistive voltage sensor, reset IC, over voltage IC, under voltage IC, flip flop, resistance bridge, direct or indirect current sensor such as a Rogowski coil which can sense the current and cause a switch based on a reduction in the load current as a result of lower voltage applied to a resistance, combined sensor, closed loop hall effect, open loop hall effect, pulsed voltage detection, transducers, electroscope, galvanometer, daly detector, farady cup, hall probe, magnetic anomaly sensor, magnetometer, magnetoresistance, MEMS magnetic field sensor "microelectromechanical system", metal detector, transformer, inductor, microcontroller, microprocessor, controller, processor, transistor, transistors, planar hall sensor, radio detection sensor, particle detector, and measurement to action conversion systems, devices and or sensors such as light level non limiting examples may include light dependent resistor, photodiode, photo-transistor, solar cell, infrared sensor, kinetic inductance detector, light addressable potentiometric sensor, radiometer, fiber optic sensor, charged-coupled device, CMOS sensor "complementary metal-oxide semiconductor", thermopile laser sensor, optical position sensor, optocoupler, photo detector, photomultiplier tubes, photoelectric sensor, photoionization detector, photomultiplier, photo-resistor, photo-switch, phototube, scintillometer, shack-hartmann, single-photon avalanche diode, superconducting nanowire single-photon detector, transition edge sensor, visible light photon counter, wavefront sensor, temperature non limiting examples may include thermocouple, thermistor, thermostat, bolometer, bimetallic strip, calorimeter, exhaust gas temperature gauge, flame detection, gardon gauge, golay cell, heat flux sensor, infrared thermometer, microbolometer, microwave radiometer, net radiometer, quartz thermometer, resistance thermometer, silicon bandgap temperature sensor, special sensor, pyrometer, resistive temperature detectors, capacitive temperature detectors, force and or pressure non limiting examples may include strain gauge pressure switch, load cells, barograph, barometer, boost gauge, bourdon gauge, hot filament ionization gauge, ionization gauge, mcleod gauge, oscillating U-tube, permanent downhole gauge, piezometer, pirani gauge, pressure sensor, pressure gauge, tactile sensor, time pressure gauge, air flow meter, bhangmeter, hydrometer, force gauge, level sensor, load cell, magnetic level gauge, torque sensor, viscometer position non limiting examples may include potentiometer, encoders, reflective/slotted opto-switch, LVDT "linear variable differential transformer"/strain gauge, speed non limiting examples may include tachto-generator, reflective slotted opto-coupler, Doppler effect sensors, sound non limiting examples may include carbo microphone, piezo-electric crystal, resonance, geophone, hydrophone, lace sensor, guitar pickup, microphone, seismometer, surface acoustic wave sensor passive sensors, active sensors, analog sensor, digital sensor, chemical non limiting examples may include chemical field effect transistor, electrochemical gas, electrolyte-insulator-semiconductor, fluorescent chloride sensor, hydrographic, hydrogen sensor, H2S sensor "hydrogen sulfide", infrared point sensor, ion-selective electrode, non-dispersive IR sensor "infrared", microwave chemistry sensor, oflactometer, optode, o2 sensor "oxyegen", pellistor, potemtimetric sensor, redox electrode, RF sensor "radio frequency"\, voltmeter, ammeter, proximity sensor, wireless and or wired connection.

Switching Methods and Devices

Options for switching methods and devices for switching and or control operations and or a connection to of a deflection converter and or related/connected systems and components and referenced as possible embodiments of the disclosed invention of the following non-limiting examples; late switch, momentary switch, devises such as relays, single pole relay, multi pole relay, single throw relay, multi throw relay, reed switches, reed relays, mercury reed switches, contactors or commutators which can utilize a rotary or mechanical movement action, for instance a commutator(s) as the switching devise, utilizing arrangements of contact points or brushes or mercury brushes, to allow charging and discharging, additionally switching mechanisms may include, limit switch, membrane switch, pressure switch, pull switch, push switch, rocker switch, rotary switch, slide switch, thumbwheel switch, push wheel switch, toggle switch, pole switch, throws and form factor switches, trembler switch, vibration switch, tilt switch, air pressure switch, turn switch, key switch, linear switch, rotary switch, limit switch, micro switch, mercury tilt switch, knife switch, analog switch, centrifugal switch, company switch, dead man's switch, firemans switch, hall-effect switch, inertia switch, isolator switch, kill switch, latching switch, load control switch, piezo switch, sense switch, optical switch, stepping switch, thermal switch, time switch, touch switch, transfer switch, zero speed switch, wireless, RF signal, carrier wave, contact and or wireless induction, electromagnetic diffusion.

Electronic devices may be used for controlling switching and or be the switches and or for operation and or control of systems and or components and may include non-limiting examples such as transistors, thyristors, mosfets, diodes, shockley diodes, avalance diodes, Zener diodes and their reversal breakdown properties, signal diodes, constant current diodes, step recovery diodes, tunnel diodes, varactor diodes, laser diode, transient voltage suppression diode, gold doped diodes, super barrier diodes, peltier diodes, crystal diodes, silicole controlled rectifier, vacuum diodes, pin diodes, gunn diodes, and additionally transistors such as junction transistors, NPN transistors, PNP transistors, FET transistors "field effect transistor", JFET transistors "junction field effect transistor", N Channel JFET transistors, P Channel JFET transistors, MOSFET, N channel MOSFET, P Channel MOSFET, Function based transistors, small signal transistors, small switching transistors, comparator, op amp, decade counter, power transistors, high frequency transistors, photo transistors, unijunction transistors, thyristors not limited to silicone controlled rectifier, gate turn off thyristor, integrated gate commutated thyristor, MOS controlled thyristor, Static induction thyristor, and any switch or mechanism to perform this desired function. Additionally, artificially created voltage drops could be used to maintain determined voltage range utilized through switching, this could include in series diodes that can be individually bypassed, creating a consistent voltage by continuing to bypass each diode using a switch to eliminate their in-circuit voltage drop.

Applications

This system is described with reference to the preferred embodiment of a deflection converter capacitor charging circuit, though in some embodiments the method involved herein may utilize accumulators and or capacitors and switch operations referenced as possible embodiments of the disclosed invention of the following non-limiting examples, and may be beneficial for use with other power generation methods or a supply current such as AC circuits, photovoltaic, piezoelectric, thermoelectric, ambient, RF, fuel cell, and electrochemical, existing induction sources such as wind turbines, hydroelectric, geothermal, coal, natural gas, nuclear, wave energy, liquid gas such as oxygen and other pressure based systems.

Applications and charging systems where in the use of this technology is to expand the efficiency and useful operation of devices such as and referenced as possible embodiments of the disclosed invention of the following non-limiting examples of; cell phones, mobile devices computers, transportation would be greatly benefited by the adoption of this technology either as an efficiency increasing method, or power reducing method (ie moving up the transmission supply stream eliminating transformer point wastage), this includes vehicles and transportation or devices, air transportation or devices, sea transportation or devices, space transportation or devices and electronic devises and or systems as well as high power consuming devices such as lasers, particle accelerators and electromagnetic and or magnetic fields. Additionally, power producing equipment generators efficiencies and or power utilization may be increased as a result of a combinational arrangement with this system and method which will be of great benefit for many practical implementations. The system and method may be adopted for, and may be scaled up to large-scale industrial applications and for use with a base load power supply, or miniaturized, even to the atomic state for the new generation of mini, micro or atomic sized devises, and or any possible sizes or combinations within this range that may benefit from this top down charging method, and or tapping into a flow of current for maximum efficiency. This improved efficiency may come from power transmission and generating systems, industrial and or commercial to consumer electronics by improving traditional RC circuits and systems and improving efficiency and or eliminating power loss.

Implementations

The devices applications and possible uses in our modern electricity based world would be too great a number of possibilities to list in a single document, it should be clear to the reader that because of the sophistication of the many inventors, and institutions of the world that this technology can be utilized for virtually any use that requires power and uses some form of electric, electrostatic, electrochemical, or electromagnetic field storage device or accumulator, so a non-limiting example of a potential use embodiment would be a devise that requires an electric current, or a magnetic field to operate from nano sized to commercial industrial sized, with an electrical connection that is direct connection and or contact connection and or wireless connection and or combinational connection and or for electrical current and or for information and or instructions and or command allocations and or control, with some of the notable examples being transportation (cars, trucks, airplanes, ships, trains, flying craft, automobile, or machinery), electrical production and transmission such as (single or multi dwelling, electrical grid supply, commercial or industrial supply, existing electrical generation systems and machines), and electronic devices such as (implantable devises, portable electronics, electronic devices, electrical devices, phones, smart phones, computers, tv's, heaters, air conditioners, lighting, lasers, particle accelerators, electromagnetic devices, miniature and or nano-electronics or devises) and or all power and or electrical consuming devises and or equipment.

Resistance and Current Control

The deflection converter device and or circuit may benefit greatly by designing architecture to control and or change a circuit and or power source and or a circuits resistance and or current and or voltage at different points in time referenced as possible embodiments of the disclosed invention of the following non-limiting examples of for instance; during and or before and or after operation, to control current and or voltage and or connections and or timing operations and or power conversion and or rate and or time, which may be accomplished with devices and possible embodiments of non-limiting examples may compose; electrical connection, contact, wireless connection, hybrid and or combinational connection, motorized rheostat, rheostat, varistors, potentiometers, digital potentiometers, thermistor, photo variable resistor, photo conductive resistor, light dependent resistor, linear resistor, non linear resistor, carbon composition, wirewound, thick film, surface mount, fusible, cermet film, metal oxide, carbon film, metal film, resistor, trimmer resistor, resistors and or plurality thereof in both series and or in parallel and or subsequent or array, diode, avalanche diode, resistance and or impediment, digital potentiometers, or utilizing flip flops, counters, IC's, decoders, with voltage sensing devices such as non-limiting examples of; window comparators, comparators, analog to digital converter(s), digital to analog converter(s), controllers, micro controllers, voltmeter, ammeter, galvometer, hall effect sensor, photo sensor, optocoupler, to trigger actions that change the; circuit and or circuit(s) or plurality thereof, current, voltage and or potential, resistance, load or additional load(s), and or may also utilize buck converters and or boost converters and or autotransformers, variable frequency transformer, cycloconverter, switching amplifier, vibrator, switch-mode power supply, mains power supply unit, static inverter, multilevel inverter, multi-phase inverter, resonant inverter, uninterruptible power supply, inverter, power converter, modulator, multi-mode modulator, pulse width modulator, multiple pulse width, carrier base pulse width modulation, depending on the operation to achieve a desired operational and variable and or stable/consistent voltage and or current, and may include non-isolated topologies such as; buck, boost, buckboost, split-pi (boost-buck), Cuk, sepic "single-ended primary-inductor converter", zeta, charge pump, switched capacitor, and isolated topologies such as flyback, ringing choke converter, half-forward, forward, resonant forward, push-pull, half bridge, full bridge, resonant zero voltage switched, isolated Cuk, quasi-resonant zero current/zero voltage switch. This resistance may be used to control current and or voltage to ensure the desired output power at different stages and or during operation of a varying potential and or current power supply or source.

Management Systems and Processes

The management system uses a system for managing energy, accumulation, storage, switch, and discharge system hereinafter referred to as "management system" defined as; to handle, direct, govern, or control in action or in use, the device and it's functions, processes, actions, tasks, activities, systems, and given or directed instructions, the input and output characteristics of charging and discharging circuits, circuits, energy sources or electricity supply, driving actions, motors, magnetic fields, oscillation cycles, memory, controls, and components.

The device may be connected and controlled by any number of management systems and techniques and possible embodiments and functions of possible embodiments may include one or more of the following non-limiting examples including; a system controller or microcontroller, embedded microprocessor, integral controller, derivative controller, system-on-a-chip, digital signal processor, transistor oscillation circuit, semiconductor oscillation circuit, comparator, op amp, decade counter, silicone controlled rectifier, Triac®, field programmable gate array, or paired with an existing CPU, in a non-limiting example of a master and slave configuration. The controller, is controlled by a computer code or script, embedded system, or artificial intelligence, controlling commands of the controller, connected to the circuit, may use a plurality and multitude of different switching devices and current and polarity control devices and may comprise different switching device and or capacitor/electrostatic storage device arrangements, The input and output of each capacitor may be connected permanently and or not permanently to the device, separate output switches, or a single switch or relay or not, and may include relay poles, which could be any number of different types or styles of relay's or transistors, thyristor, or layered semi-conductive material designed for electronically controlled switching, with relays, controlled by a CPU, or microcontroller, embedded microprocessor, integral controller, derivative controller, system-on-a-chip, digital signal processor, transistor oscillation circuit, semiconductor oscillation circuit, silicone controlled rectifier, triac, field programmable gate array, or paired with an existing CPU, in a non-limiting example of a master and slave configuration. The CPU, may be controlled by a computer code or script, embedded system, or artificial intelligence, that tells the system controller, to send a signal to relay's and or switches for controlling charging operations, which may be connected to a charge booster or multiplier circuit, which may discharge through a load, and or another storage device, and or an electric current to create usable work.

Additionally some embodiments may utilize a management system as a component of the device which may control various functions some or all of which may consist of, the operation of all electronically operated components; the charging and discharging and combinational arrangements; power regulation means for regulating power; a memory section, a search starting means for starting a search; measurement data acquiring means for acquiring magnetic field data and electric power data, the magnetic field data being measured values of the energy sources magnetic field. The electric power data representing information associated with electric power that is outputted from the energy source and required for operation, and used by the management system. Functions may also include deriving means for deriving a relational equation that holds between the magnetic field data and electric power data to maintain target values including voltage and current output. Monitoring functions for abnormal state determining, and may include means for determining whether or not the energy source, a collection device, or any energy switching, energy transforming, or managed circuits are in an abnormal state. Searching functions and a search procedure, selecting means for selecting, and in accordance with a result of determination of the abnormal state determining means, a procedure for managing abnormal energy sources, magnetic fields, accumulation devises, capacitors/electrical potential storage devices, energy switching devises, transforming devices, management circuits.

In some embodiments, the management system is needed to facilitate managing the electric current, then storing the collected charges, and or switching collection devices in circuit orientation, and or discharging collected charges, then switching accumulators and or electrical storage devices; at a controllable rate, that may be replicated and controlled to an extremely high number of pluralities and or charging circuits within one or more deflection converters, charging one or more electrostatic storage devices simultaneously, alternately, congruently, or not. To maximize energy from an energy source and or accumulators and or electrical storage devices can be accomplished with current and voltage measuring devises, switches, accumulators and or electrical storage devices and or including capacitors, dc-dc charge booster or multiplier, transformers and or sequential and or parallel and or series arrangements. And in some embodiments a simplified management system may be beneficial utilizing some and or different arrangement of listed or other functions, and additionally a mechanical system in some embodiment may be advantageous, for instance pairing with a commutator switch, or relays, utilizing the driving forced for controlling switching and energy characteristics, and in some embodiments utilizing no management system instead using current oscillators, comparators, op amps, decade counter, motor, generator or natural means to control the switching force and or speed, this simplified system may be advantageous for a consistently regulated and or varying deflection converter charging device.

Each circuit and module is an electrically connected system of components, and may be managed by the management system, which may include additional devises and systems such as; a steady DC current and or alternating current, circuit, a display, a direct current power conditioner, current power output interface, power converter, a thermometer, a thermometer interface, magnetic field sensor, magnetic field sensor interface, voltmeter, voltmeter interface, an ammeter, an ammeter interface, a measuring devise, a measuring devise interface, an inverter, an inverter interface, a system controller, a system controller interface, power control means, power system interface, a target value setting capable device, a target value capable setting device interface, an input device, a target value interface, an alternating current output interface, a transformer(s), a variable frequency drive, a variable frequency drive interface, a central processing unit "CPU", a processor, estimating means, computing means, network interface, load, search control means, relative relational expression equations, abnormal measurement memory, time series data memory, measurement data memory, accuracy data memory, operating estimations data, target value memory, a rated value database.

The control section serves to control the overall control and operation of various components of the management system, circuits, modules, and the memory section serves to store information. The control section is configured to include a measurement data acquiring section (measurement data acquiring means), the amount of current/voltage (current/voltage acquiring means), a computing section (computing means), a target value setting section (target value setting means), a search control section (search starting means), power system section (power system controlling means), and in estimating section (estimating means). Further the memory section is configured to include a target value memory section, a memory section, and a relative relational expression equation section, a rated value database.

The memory section serves to store, as measurement data, measurement data obtained from each measuring instrument while the management system is operating. Specifically, the measurement data contains the following measured values measured at the; measure point of time, operating current value, operating voltage value, amount, magnetic field strengths, and temperature. The measure point in time is data representing year, month, day, hour, minute, and second. Further the operating current value in operating voltage value refer to values of an electric current and voltage is measured at a point, respectively.

Further, temperature is measured by the thermometer; magnetic fields are measured by a magnetic field sensor. The rated value database is provided with a memory section and a target value memory section. The memory section serves to store relative relational expression equations, for maintaining operating current values and operating voltage values. The target value memory section, serves to store target values of the operational estimations, and accuracy of relative relational expression equations, that determine power usage and magnetic field strength relations, to ensure optimal system performance and efficiency, that can be interpreted for command allocation.

The measurement data acquiring section, serves to acquire measuring values from each measurement instrument. Specifically, the measurement data acquiring section acquires measurement data of (electrical power data, temperature, magnetic field data), which is time-series data, containing the electric current value, the voltage value, the temperature, the magnetic fields, from the measuring instruments of the ammeter and voltmeter, the magnetic sensor, thermometer, and sends the measurement data to the search control section of the database.

The search control section, searches for relative relational expression equations, to interpret historical relations to measurement values, and interpret proportional relationships between stored measurement values, operational characteristics, and predetermined target value ranges, including output characteristics, discharge relational information including combinational arrangement output power data, cluster and module combination data, and duty cycle optimization equations.

The search control section, can compute measurement characteristics if measurements have been measured and stored even once and can compare characteristics with the target value setting section, which may also incorporate a learning effect, or artificial intelligence, interpretations can be interpreted by the central processing unit CPU, which can send instructions to the system controller, which can then send command signals to active switching and control systems, and components, to control predetermined, or instructed operational target values and functions.

The measurement data acquiring section, also serves to determine faults, by acquiring and comparing measured values from the measurement data memory storage section, and by interpreting abnormal operating system measurements. Abnormal measurements, are stored in the memory storage section, and additionally may be sent to the display, to indicate to users of the management system, abnormal measurements, or sent to the control section and the target value memory section, to perform tasks such as bypassing abnormally operating circuits, modules, systems, or component's, or by compartmentalizing systems containing faults and maintaining predetermined target operating conditions, output power characteristics and functions.

It should be noted that measurements may be computed by performing measurements by measuring each instrument once, or more than once, at a time of introduction of the management system, or may be computed as a search performed manually by the user's operating the management system, or may be performed automatically, e.g., regularly. In particular measurements may be performed at predetermined intervals, or from time to time. The exacting control of the electromagnetic, electrostatic and electrochemical fields under the devices management is a main primary concern of the disclosed invention, switching consumption is of concern in order to not reach an inefficient level, though a certain trade-off of output energy and energy consumption occurs.

Storage Devices

This system and method takes advantage of the natural electrical tendencies and physical interactions of capacitors (electrostatic storage devices) and this type of electrical component, there for a broad range of possible alternatives may be used to accomplish this system and methods novelty and usefulness, referenced as possible embodiments of the disclosed invention of the following non-limiting examples include; accumulators, electrostatic accumulators and or storage devices, batteries and or electrochemical storage devices, including hybrids, magnetic field storage devices such as inductors, coils, or electrical storage devices may be substituted or used in conjunction with the disclosed invention and are hereby claimed in this disclosure.

The circuit may use a plurality and multitude of different storage devices for storing a charge and or for switching the stored charge as described in this system and method referenced as possible embodiments of the disclosed invention of the following; accumulators and may comprise different storage device arrangements, the circuit operating best with polarized condensers for safety and reducing resistance though operation can still be accomplished with non-polarized storage devices, and may include accumulator balancing or IC's, non-limiting examples of possible embodiments include; single large capacity storage device, multilayer or multi cell configuration, multi storage devices, magnetic field storage device, condensers, and or capacitors non limiting examples include ceramic, paraelectric, ferroelectric, mixed oxides, class 1, class 2, multilayer, decoupling, suppression, high voltage power, power film and or foil, nano-structured crystalline thin film, composite ink/paste, crosslinked gel electrolytes, electrolytes, metalized, plastic, polypropylene, polyester, polyphenylene sulfide, polyethylene naphthalate, polytetrafluoroethylene, RFI "radio frequency interference capacitor", EMI, snubber, motor run, AC capacitors, electrolytic, Aluminum, tantalum, niobium, non-solid, solid manganese oxide, solid conductive polymer, bipolar, axial, SMD "surface mount capacitor", chip, radial, hybrid capacitors, Supercapacitors, double layer, pseudocapacitors, hybrid capacitors, electrochemical capacitors, ultracapacitors, electric double layer capacitors, APower-CAP®, BestCap®, BoostCap®, Cap-XX®, DLCAP®, EneCapTen®, EVerCAP®, DynaCap®, Faradcap®, Green-Cap®, Goldcap®, HY-CAP®, Kapton capacitor, Super Capacitor, SuperCap®, PAS Capacitor "polyacenic semiconductor capacitor", PowerStor®, PsuedoCap, Ultracapacitor, Double layer lithium-ion, class X "across the line", class Y "line to ground", carbon capacitors, graphene capacitors, graphite capacitors, integrated capacitors, nanoscale capacitors, glass capacitors, vacuum capacitors, SF6 gas filled capacitors, printed circuit board capacitor, conductive wire capacitor, mica capacitors, air gap capacitors, variable capacitors, tuning capacitors, trimmer capacitor, super dielectric material capacitor.

Current Source and Power Supply

Steady electric current could come from a number of possible sources referenced as possible embodiments of the disclosed invention of the following non-limiting examples including; rectified AC current supply, or an AC supply controlled by semiconductors that route pulses of a given frequency for utilization. An alternating current that preforms the actions of the switches by controlling the charge and discharging of the storage device by controlling alternation frequency or by sizing a capacitance to the size benefitting from the frequency of alternating current when its amperage flow rate is considered, DC current supply, generators, main utility grid, rectified or not AC current, solar power, wind power, combustion, geothermal as well as the properties in batteries and chemical storage devices exert a stable steady electric current and could be considered for the purposes of the disclosed invention as a steady electric current, and could be a possible source of a steady electric current, and some non-limiting examples may include and may also include electrochemical storage such as, batteries, inductors, electro chemical cell, half-cell, voltaic cell, galvanic cell, super capacitor, super conducting magnetic energy storage unit, flow battery, rechargeable battery, ultra-battery, battery cells, lead acid, nickel-cadmium, nickel metal hydride, lithium ion, lithium ion polymer, nickel iron, nickel zinc, copper zinc, nickel hydrogen, Zinc air, silver zinc, sodium sulphur, lithium metal, lithium air, lithium sulfur, silicon carbon nanocomposite Anodes for li-ion, wet cell, dry cell, gold nanowire, magnesium batteries, solid state li-ion, fuel cell, graphene, micro supercapacitors, sodium ion, foam structure, solid state, Nano yolk, aluminium graphite, aluminium air, gold film, sodium ion, carbon ion, crystalline tungsten, which could also include an electrochemical combination of different atomic state metals or oxides or of any combination of chemically active charge storing metals, oxides, minerals or their derivatives.

Output Characteristics

Output characteristic may be controlled by or utilize one or more combinations of the following referenced as possible embodiments of the disclosed invention of the following non-limiting examples; DC-DC power converter, DC-AC power converter, power converter, converter, step-down converter, step-up converter, switched-mode power supply, a voltage booster, boost converter, or multiplier, or buck converter, boost-buck converter, may be utilized, or direct feed into a load, or utility transmission system, the current may be fed into an inverter, charge booster or multiplier booster, jewel thief, dc-dc booster, synchronous rectification, capacitor and or inductor and or combination of the two, switching converter, linear regulator, multiphase buck, multiphase boost, synchronous buck, capacitor network, flyback converter, magnetic DC converter, Dickson multiplier, capacitive voltage converter, electromechanical conversion/converter, electrochemical conversion and or converter, redox flow batteries, vanadium redox battery, switch regulator, regulator, spark gap, transducer, or used to create bio fuels including methane, helium, or used to control a heat exchange system for instance to control the expansion and contraction of gases to produce water.

Output current characteristics may be controlled a number of different ways and referenced as possible embodiments of the disclosed invention of the following non-limiting examples include; direct current continuous output, direct current intermittent output, pulse width modulation, the accumulator could be reversed in the circuit causing a voltage increase in the circuit and recycling the charges in the accumulator, current may be routed through an inverter, or into additional transformer(s) which can be used to create a pulsed alternating current or alternating current output, or be arranged with additional modules with positive and negative lead connections arranged in opposite to provide an alternating current, by controlling the discharge alternation between the module into the transformer, which may in some embodiment not require the transformer. Current may be discharge instantaneously or through a controlled discharge, into a load and or a voltage regulator load combination for use, and may additionally be controlled through transistors or switches and then into resistances and or resistors of differing values to ensure the current traveling into a circuit remains consistent even though the voltage potential of the circuit has increased.

Output can be additionally routed and further controlled by an electronic management system to measure output current and voltage, and then control and regulate the delivery of this current to a load or storage device that may be a set, desired level and or reactive to operation conditions and or instructions.

The CPU and system controller may be used to dictate the frequency of the charge and or discharge cycle and or segregation of charged and or uncharged and or partially charged devices, and the combinations and arrangements of additional switches and or capacitors/electrostatic storage devices, to gain the desired voltage level and total stored charge. Arrangements may include instantaneous discharge, predetermined storage levels before discharge, voltage measurement based storage discharge, power factor control, continuous sampling and adjustment of current output, oscillation based discharge, operating range or band discharge, and additionally can be arranged to meet virtually any desired and defined frequency, voltage and current with available circuits, and may be multiple different values or tolerance level arrangements, arranged in different configurations or different outputs that can then be used to do desired work or for storage.

Load

The load is a target of the power supply; it is illustratively an electric device that is in action by the supplying electric power. It should be noted that the management system may be configured to be connected to a commercial power system so as to be able to collaborate with it, or may be configured to independently to operate without collaborating with a commercial power system.

The present invention is not limited to the description of the embodiments provided but may be altered by skilled person within the scope of the claims. An embodiment based on the proper combination of technical means disclose in different embodiments is encompassed in the technical scope of the present invention.

The blocks or, in particular, the control section of each of the oscillation circuits and or the management system may be achieved through hardware logic or through software by using a CPU as described. That is each management system and circuit, includes a CPU central processing unit, which executes instructions from a program for achieving the corresponding function; a ROM read-only memory, in which the program is stored; a ram random access memory, to which a program is loaded; a memory device recording medium such as memory, which the program various types of data are stored; and the like.

Moreover, the object of the present invention can be attained by mounting, to each of the circuits or modules or device, a recording medium computer readably containing a program code to execute form program, intermediate code program, source program of software for achieving the before mentioned function, in order for the computer CPU or MPU "memory processing unit" to retrieve and execute the program code recorded in the recording medium, through a non-limiting example of a system controller. Examples of the recording medium encompass: tapes, such as magnetic tapes and cassette tapes; discs include magnetic disk, such as floppy disks, and hard disks, and optional desks, such as a CD-ROM's "compact disk read-only memory", MO's "magneto-optical", MDs "minidisk", BBs "BlackBerry®", DVDs "digital video disks", and CD-Rs "compact-disk recordable"; cards, such as icy cards including memory cards and optical cards; and semiconductor memories, such as masks ROM's "read only-memory", EEPROM's "electrically erasable programmable read-only memory", and flash ROM's.

Further each of the management systems can be made connectable to a communications network so the program code can be supplied via the communications network. Examples of the communications network can include, but are not limited particularly to, the Internet, and intranet, and extranet, a LAN "local area network", ISDN "integrated service digital network", a VAN "value-added network", a CATV "coaxial" communication network is not particularly limited. For example it is possible to use, as a transmission medium, a cable such as a IEEE1394 "interface standard", a USB "universal serial bus", a power line, a cable TV line, a telephone line, an ADSL line "asymmetric digital subscriber line", etc. alternatively, it is possible to use, as a transmission medium, a wireless system such as infrared rays as an IrDA "infrared data association" and a remote controller, Bluetooth, 802.11 wireless, HDR "high dynamic range", cellular phone network, satellite line, a terrestrial digital network, etc. it should be noted that the present invention can be achieved in the form of a computer data signal realized by electronic transmission of the program code and embedded in a carrier wave.

Further, the present invention can be expressed as follows: a circuit according to the present invention is for improving efficiency and increasing utilization of energy and power available to charge an electrical storage device and to a load or circuit, a managing system for managing the operational voltages and current from the devise utilizing a novel electronic circuit and method, the managing system being configured to include: A control means to control the overall control and operation of various components of the system, a circuit, a steady electrical current or energy source, switching means for switching potentials and or accumulators and or electrical storage devices such as capacitors, a memory storage means to store information in memory, amount of magnetic field/temperature/acquiring means for acquiring an amount of a magnetic field and/or temperature; current/voltage acquiring means for acquiring an electric current value and/or voltage value, a computing section computing means to compute information and instructions, a target value setting means to set target values, search starting means to control searching, power system controlling means to control power system functions, estimating means to preform estimations, searching means for searching memory deriving means for deriving relational expression equations. Further the memory section is configured to include a target value memory section, a memory section, and a relative relational expression equation section, a rated value database.

Further, the method according to the present invention for managing the operational voltages and current from a circuit is a control method for the management, and for controlling the operational voltages and current from a circuit and or accumulators and or electrical storage devices from an electric current, utilizing an electronic circuit to control the operation of accumulators and or electrical storage devices and or capacitors, their input and output characteristics, their orientations in the circuit and combinational arrangement, their charging characteristics, the method including, a target value setting input step, a discharge frequency setting step, making a connection to a circuit and accumulators and or electrical storage devise step, a making a connection to a charge controlling and or transforming devise step, a migrating charges from an electric current or energy source step, a storing and or transforming/converting charges step, a step of switching the capacitor step, a step of disconnecting from electrical current and or changing storage device to a different orientation and or circuit, a step of connecting to a load, a step of acquiring an electric current value and/or voltage value, an amount of magnetic field/temperature/acquiring step, a step of recording acquired information in the rated value database memory in appropriate sections, a step of computing and interpreting information based of recorded memory data, a step of forming instructions to send to system controller based on recorded memory data, set target values, and their relational effects to stored and flowing charges, a step of communicating information to the system controller for task execution based on the interpreted and set target values, a step of outputting power through a converter/inverter to a load and or electrical busses and or power distribution system, based on set target values, relational estimations, and inputted commands, or direct feed and or inverted feed and or a variable resistance feed into a load, electrical system or other, a step of repeating the described operation.

The foregoing was intended as a broad summary only and only of some of the aspects of the invention. It was not intended to define the limits or requirements of the invention. Other aspects of the invention will be appreciated to one skilled in the art by reference to the detailed description of the preferred embodiment and to the claims. It is intended that all such additional systems, methods, aspects, and advantages be included with this description, and within the scope of the present disclosure, and be protected by the accompanying claims.

The terms used in this disclosure are not for limiting the inventive concept but for explaining the embodiments. The terms of a singular form may include plural forms unless otherwise specified. Also, the meaning of "include," "comprise," "including," or "comprising," specifies a property, a region, a fixed number, a step, a process, an element and/or a component but does not exclude other properties, regions, fixed numbers, steps, processes, elements and/or components. The reference numerals presented according to a sequence of explanations are not limited to the sequence.

In addition, some embodiments of the present disclosure may include patents or public disclosures already issued relating to this art, when used in conjunction with this system or method these prior schemes may be able to utilize substantial amounts of usable power and greatly improve efficiency. By using the described system and method many of these previously failed schemes and inventions may be able to manage power in a more efficient commercially viable way, and when referring to these said inventions or schemes when combined with this disclosed system or method these devices should be considered new devices or improvements thereof and confer the protection of this disclosure, or patent, this does not limit the scope of the present disclosure instead giving reference to where some embodiments of this discovery may fit into the art.

The invention claimed is:

1. A method for charging an electrostatic storage device by a charging device, the method utilizing displacement current, the method comprising:
   (a) powering a load by an electrical circuit;
   (b) allowing, by at least one switch, the connection and disconnection of said electrostatic storage device from said electrical circuit, to allow the charging and isolation of said electrostatic storage device;
   (c) causing, by said electrostatic storage device being connected in series with said load, an electrical displacement current through said electrostatic storage device to a power converter and said load;
   (d) converting, when said power converter connected by said at least one switch between said electrostatic storage device and said load, the electrical current and voltage potential from said electrostatic storage device, wherein charging said electrostatic storage device causes a varying impedance causing a varying voltage supplied to said power converter, said power converter adjusting its duty cycle in response to the varying impedance from said electrostatic storage device in order to ensure a consistent current and voltage to said load.

2. The method of claim 1, wherein the charging circuit comprises an electrical storage device comprising at least one of said electrostatic storage device and a hybrid electrical storage device.

3. The method of claim 2, wherein the charging device comprises said at least one switch for connecting and disconnecting an electrical storage device.

4. The method of claim 3, wherein the electrical circuit comprises said load.

5. The method of claim 1, wherein said electrostatic storage device comprises a capacitor.

6. The method of claim 1, wherein the charging device comprises said power converter.

7. The method of claim 1, wherein the charging device comprises at least one of a plurality of electrical storage devices and a plurality of control circuits.

8. The method of claim 1, wherein the charging device comprises a plurality of different said electrostatic storage devices.

9. The method of claim 1, wherein the charging device comprises a management system.

10. The method of claim 9, comprising: by the management system, managing the electric current, storing collected charges, switching a collection device in circuit orientation, discharging collected charges, and switching at least one said electrostatic storage device at a controllable rate.

11. The method of claim 1, comprising utilizing, by the charging device, at least one of an initiation device, a control device, and an electrical sensing device.

12. The method of claim 1, comprising utilizing by the charging device said at least one switch.

13. The method of claim 1, comprising by controlling, by the charging device, at least one of an electrical current and a voltage potential.

14. The method of claim 1, comprising changing a resistance of at least one circuit by the charging device comprising circuit architecture composed of at least one of a current control device, a voltage control device, and a resistor.

15. A system for charging an electrostatic storage device, the system utilizing displacement current, the system comprising:
  (a) a load for, in operation, receiving power from an electrical circuit;
  (b) at least one switch for allowing the connection and disconnection of said electrostatic storage device from said electrical circuit, to allow the charging and isolation of said electrostatic storage device;
  (c) said electrostatic storage device being connected in-series of said load causing an electrical displacement current through said electrostatic storage device to a power converter and said load;
  (d) said power converter, connected by said a least one switch between said electrostatic storage device and said load, said power converter being operable to convert the electrical current and voltage potential from said electrostatic storage device, wherein the charging of said electrostatic storage device causes a varying impedance causing a varying voltage supplied to said power converter, said power converter being operable to adjust a duty cycle of said power converter in response to the varying impedance from said electrostatic storage device in order to ensure a consistent current and voltage to said load.

16. The system of claim 15, wherein the charging circuit comprises an electrical storage device comprising at least one of said electrostatic storage device and a hybrid electrical storage device.

17. The system of claim 15, wherein the charging circuit comprises an electrical storage device comprising a capacitor.

18. The system of claim 16, wherein the charging device comprises said at least one switch for connecting and disconnecting said electrical storage device.

19. The system of claim 18, wherein the electrical circuit comprises said load.

20. The system of claim 15, wherein the charging device comprises said power converter.

21. The system of claim 15, wherein the charging device comprises at least one of a plurality of electrical storage devices and a plurality of control circuits.

22. The system of claim 15, wherein the charging device comprises a plurality of said electrostatic storage devices.

23. The system of claim 15, wherein the charging device comprises a management system.

24. The system of claim 23, wherein the management system is for: managing the electric current, storing collected charges, switching collection devices in circuit orientation, discharging collected charges, and switching at least one said electrostatic storage devices at a controllable rate.

25. The system of claim 15, wherein the charging device is operable to utilize one or more of an initiation device, a control device, and an electrical sensing device.

26. The system of claim 15, wherein the charging device is operable to utilize said at least one switch.

27. The system of claim 15, wherein the charging device controls at least one of an electrical current and a voltage potential.

28. The system of claim 15, wherein the charging device comprises circuit architecture to change a circuit resistance during operation, the circuit architecture being composed of at least one of a current control device, a voltage control device, and a resistance.

29. A system of improving electrical charging efficiency to charge an electrical storage device utilizing a charging device and utilizing electrical displacement current, the system comprising:
  means for supplying electricity from a circuits to a load;
  means for connecting and disconnecting an electrostatic storage device from said circuit;
  means for charging said electrical storage device;
  means for controlling a varying impedance caused by said electrical storage device;
  means for utilizing a displacement current from said electrical storage device; and
  means for providing a controllable energy current and voltage to said load.

* * * * *